US008687694B2

(12) United States Patent
Wahadaniah et al.

(10) Patent No.: US 8,687,694 B2
(45) Date of Patent: Apr. 1, 2014

(54) REFERENCE PICTURE SELECTION METHOD AND APPARATUS

(75) Inventors: Viktor Wahadaniah, Singapore (SG); Chong Soon Lim, Singapore (SG); Youji Shibahara, Osaka (JP); Shinya Kadono, Hyogo (JP)

(73) Assignee: Panasonic Corporation, Osaka (JP)

( * ) Notice: Subject to any disclaimer, the term of this patent is extended or adjusted under 35 U.S.C. 154(b) by 1524 days.

(21) Appl. No.: 12/089,126

(22) PCT Filed: Oct. 2, 2006

(86) PCT No.: PCT/JP2006/319686
§ 371 (c)(1),
(2), (4) Date: Apr. 3, 2008

(87) PCT Pub. No.: WO2007/040197
PCT Pub. Date: Apr. 12, 2007

(65) Prior Publication Data
US 2010/0150240 A1 Jun. 17, 2010

Related U.S. Application Data

(60) Provisional application No. 60/723,473, filed on Oct. 5, 2005.

(51) Int. Cl.
*H04N 7/26* (2006.01)

(52) U.S. Cl.
USPC ..................................... 375/240.15

(58) Field of Classification Search
USPC ....................... 375/240.01, 240.15
IPC ........................................ H04N 7/26
See application file for complete search history.

(56) References Cited

U.S. PATENT DOCUMENTS

| 2002/0131498 A1 | 9/2002 | Sun et al. |
| 2004/0264570 A1 | 12/2004 | Kondo et al. |
| 2005/0053144 A1* | 3/2005 | Holcomb ................. 375/240.16 |
| 2005/0053147 A1* | 3/2005 | Mukerjee et al. ........ 375/240.16 |
| 2006/0008010 A1* | 1/2006 | Soh et al. ................. 375/240.24 |

FOREIGN PATENT DOCUMENTS

AU     2005 203 096     8/2005

(Continued)

OTHER PUBLICATIONS

Supplementary European Search Report (in English language) issued Aug. 31, 2010 in corresponding European Patent Application No. 06811034.5.
Orchard M.T. et al., "*Backward motion compensation for interlaced HDTV*", Signal Processing, Image Communication, Elsevier Science Publishers, Amsterdam, NL LNKD- DOI:10.1016/0923-5965(93)90012-I, vol. 5, No. 5-6, Dec. 1, 1993, pp. 487-501, XP026659285.

(Continued)

*Primary Examiner* — Jayanti K Patel
*Assistant Examiner* — Yulin Sun
(74) *Attorney, Agent, or Firm* — Wenderoth, Lind & Ponack, L.L.P.

(57) ABSTRACT

The reference picture selection method according to the present invention is a method for selecting a reference picture for a current bottom field, and includes: predicting a degree of a motion of the current bottom field using a specific field which precedes the current bottom field in coding order; setting reference picture candidates suitable for coding the current bottom field based on the predicted degree of motion; and selecting a reference picture of the current bottom field among the set reference picture candidates.

13 Claims, 27 Drawing Sheets

(56) References Cited

FOREIGN PATENT DOCUMENTS

| EP | 1 241 893   | 9/2002  |
|----|-------------|---------|
| EP | 1 422 946   | 5/2004  |
| JP | 5-41861     | 2/1993  |
| JP | 2002-330443 | 11/2002 |
| JP | 2005-260588 | 9/2005  |
| WO | 2005/088981 | 9/2005  |

OTHER PUBLICATIONS

International Search Report issued Dec. 19, 2006 in the International (PCT) Application of which the present application is the U.S. National Stage.

ITU-T H.264, Series H: Audiovisual and Multimedia Systems, Infrastructure of audiovisual services—Coding of moving video (Mar. 2005).

* cited by examiner

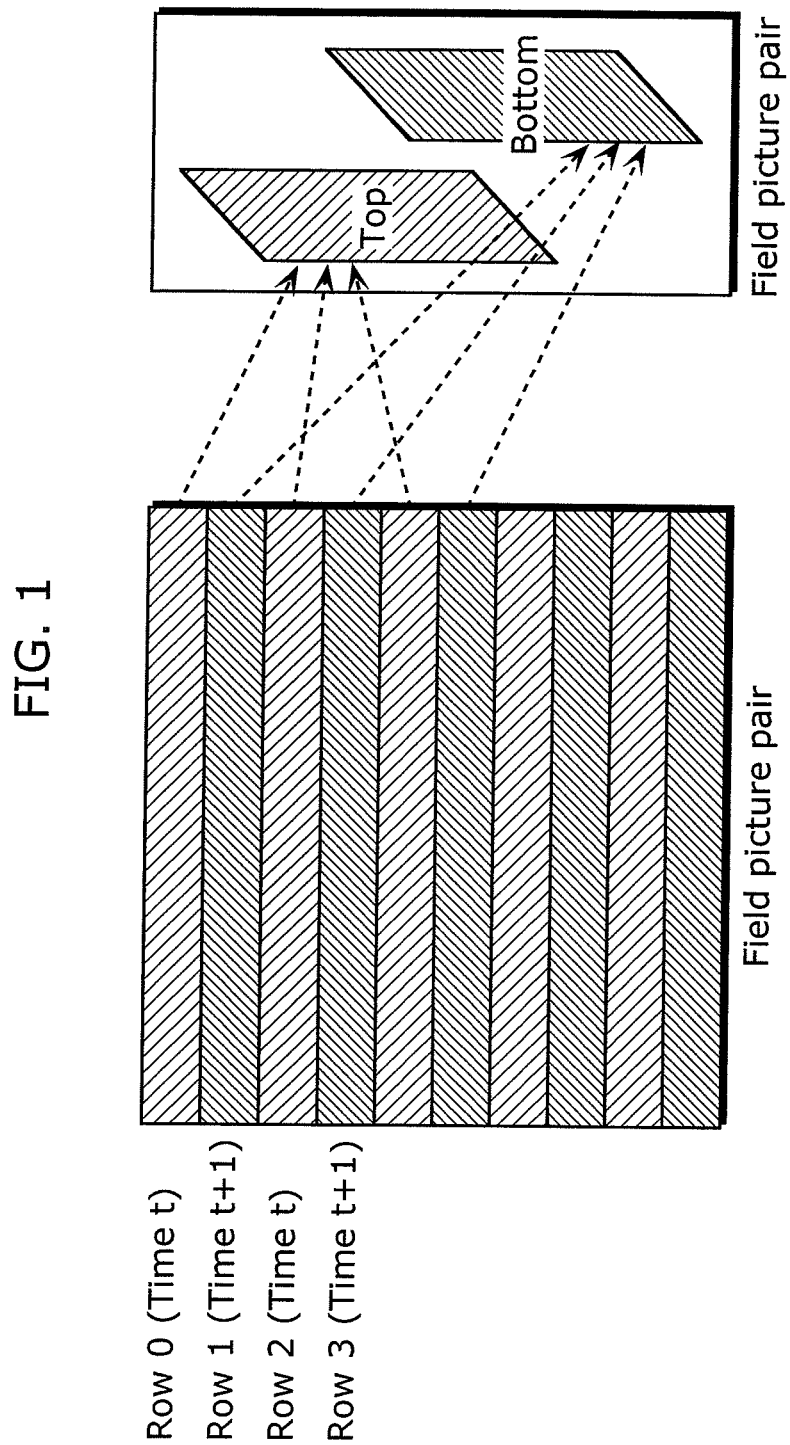

REFERENCE PICTURE SELECTION METHOD AND APPARATUS

This application is the national stage of International Application No. PCT/JP2006/319686, filed Oct. 2, 2006, which claims the benefit of U.S. Provisional Application No. 60/723,473, filed Oct. 5, 2005.

TECHNICAL FIELD

The present invention can be used in any multimedia data coding and, more particularly, in video coding that supports multiple reference pictures for motion-predictive field coding of interlaced video source.

BACKGROUND ART

An uncompressed video source can be captured in either the progressive or the interlaced scan format. The progressive scan format refers to the case where all lines of samples represent the same instances in time. In contrast, the interlaced scan format refers to the case where alternate lines of samples are captured at different instances in time. FIG. 1 is a diagram showing a field picture pair. As shown in the diagram, lines of samples captured at an earlier time t form a top field picture. As shown in the diagram, lines of samples captured at a later time t+1 form a bottom field picture. A top field picture and a corresponding bottom field picture can altogether be referred to as a field picture pair. An uncompressed field picture can be coded in frame coding or field coding. In frame coding, the top and the bottom field pictures are coded together as a single picture. In the field coding, the top field picture is coded as a separate picture from the bottom field picture. Note that, hereinafter a field picture will be simply referred to as a field.

In general, most video coding algorithms, such as the ISO/IEC 14496-2 Part 10 International Standard, employ two main coding types. Intra picture coding is performed within a picture without referring to other pictures; thus, a picture containing only sample pixels coded in intra picture coding is called an intra picture or simply an I-picture. On the other hand, inter picture coding utilizes a temporal correlation between video pictures by referring to samples from other pictures. A single-predictive inter picture (hereinafter referred to as a P-picture) predicts from one other picture, while a bi-predictive inter picture (hereinafter referred to as a B-picture) predicts from two other pictures.

Depending on the necessities of the application, the three coded picture types (intra, single-predictive, bi-predictive) can be used flexibly as determined by the video encoder. The order of the coding and decoding process (hereinafter referred to as coding order) is generally not the same as the capture order of source picture or the output order from a decoder for display (hereinafter referred to as display order). The coding order is arranged such that coding or decoding process of inter-pictures is performed after other previously-coded pictures that are referenced in the coding or the decoding process (hereinafter referred to as reference pictures).

[Non-patent reference 1] ISO/IEC14496-2 Part 10 International Standard

DISCLOSURE OF INVENTION

In H.264 (MPEG-4 AVC), more reference pictures are available in coding process in order to improve coding efficiency in inter coding. More specifically, in MPEG-2, I-pictures and P-pictures can be used as reference pictures, whereas B-pictures can also be used as reference pictures in H.264 in addition to I-pictures and P-pictures. The encoder may refer to a different reference pictures when coding different blocks in a picture. The term "block" refers to a rectangular group of pixels, such as 4×4, 8×4, 8×16 block sizes. The encoder can improve coding efficiency by selecting the most suitable reference picture per each block out of many available reference pictures.

It is preferable, in terms of coding efficiency, to select the most suitable reference picture after searching all the available reference pictures, however, it is not preferable in terms of the amount of process. More specifically, in the interlaced scan format, a B-picture after the second B-picture requires large amount of process since the B-picture can refer to coded B-pictures (especially in the bottom field), there are many pictures available for reference, resulting in large processing amount when selecting the most suitable reference picture, and complex management of a reference memory.

FIG. 2A shows an example of pictures in coding order, and FIG. 2B shows the same pictures in display order. Field pair 200 and field pair 206 are either an I-picture or a P-picture. Field pair 212 and field pair 218 are B-pictures. Among those fields, the number of fields which can be referred to when coding the bottom field 222 is larger than the number of available reference fields for the fields 202, 204 . . . 216 and 220 which are previously coded. When coding each block of the bottom field 222, one of fields 202, 204, 214, 216 and 220 can be used as a reference in the first direction, while one of the fields 208 and 210 can be used as a reference in the second direction. A video encoder selects one reference field (in the case of single-predictive coding) or two reference fields (in the case of bi-predictive coding) as the prediction reference for each block.

This selection should be performed in such a manner that coding efficiency is optimum while maintaining a high video image quality. One method to do this is to search through all available reference pictures. Unfortunately, the complexity of this method is exceptionally high, due to large number of iterations and memory accesses. Therefore, this method is not preferable in terms of amount of process and the management of reference memory.

In order to reduce the amount of process, the encoder may only search one suitable subset from all available reference pictures. The pictures belonging to the subset will be hereinafter referred to as reference picture candidates. For example, as shown in FIG. 2B, a subset which includes all pictures available as reference pictures of the current bottom field 222 to be coded except for the top field 220. With this, the processing amount for selecting the most suitable reference picture can be reduced. However, if the excluded picture is the most suitable reference picture, it is not likely to fully improve the coding efficiency. Thus, the method only to search the subset is preferable in terms of reducing the amount of process. However, it is not preferable in terms of coding efficiency.

It is an object of the present invention to provide a reference picture selection method which reduces amount of process for determining the reference picture and achieves approximately the same coding efficiency as in the case where there is no limit on the reference picture candidates.

In order to solve the problem above, a reference picture selection method for selecting a reference picture for a current bottom field to be coded when coding interlaced video, the method including: predicting a degree of motion of the current bottom field using a specific field which precedes the current bottom field in coding order; setting reference picture candidates suitable for the coding of the current bottom field, according to the predicted degree of motion; and selecting a reference picture for the current bottom field, from among the set reference picture candidates.

With this configuration, first, it is necessary to search the reference picture candidates since all available pictures may not be searched, thereby reducing the amount of process for determining a reference picture. Secondly, in accordance with the size of the predicted motion, the reference picture candidates suitable for coding the current bottom field is set, and thus the approximately same coding efficiency can be achieved as in the case where there is no limit on the reference picture candidate.

Here, in the setting the reference picture candidates, one of a temporally nearest field and a spatially nearest field may be set in the reference picture candidates, according to a prediction result for the degree of motion. Here, the temporally nearest field may be a top field in the same field pair as the current field, and the spatially nearest field may be a bottom field in a field pair which is immediately previous to the current field in coding order, the field pair being coded in bi-predictive coding.

With this configuration, the temporally nearest field and the spatially nearest field may be adaptively set as a reference picture candidate in accordance with the degree of motion.

Here, the specific field may be a bottom field in a field pair preceding the current bottom field in coding order, a first reference picture may be a top field in the same field pair as the specific field, a second reference picture may be a bottom field in a field pair which is immediately previous to the specific field in coding order, and the predicting the degree of motion may include: counting a first count and a second count, the first count being the number of blocks that are coded using the first reference picture and the second count being the number of blocks that are coded using the second reference picture; and calculating one of a ratio of the first count to the second count and a difference of the first count and the second count as the degree of motion of the current bottom field.

With this configuration, the degree of motion of the current bottom field can be predicted with a simple process of counting the first count and the second count using information which can be easily obtained in the coding process of the specific field (here, the bottom field in a field pair preceding the current bottom field in coding order). The degree of motion can be properly predicted as a ratio (or a difference) of the first count and the second count, or a ratio (or a difference) of the number of times the first reference picture is referred to and the second reference picture is referred. It is assumed that, the smaller the ratio or the difference is, the larger the motion becomes.

Here, the setting the reference picture candidates may include: comparing the ratio of the first count to the second count or the difference of the first count and the second count is compared to a threshold; and setting one of the temporally nearest field and the spatially nearest field in the reference picture candidates based on a result of the comparison.

With this configuration, the reference picture candidate can be properly set with a simple comparison process using the threshold.

Here, the specific field may be a bottom field in a field pair which precedes, by N field pairs in coding order, the field pair to which the current bottom field belongs, where N is selected from 1 to 3.

With this configuration, the motion of the current bottom field can be easily predicted by using a bottom field in a field pair which is N field pair previous to, in coding order, the field pair to which the current bottom field belongs.

Here, the specific field may be a top field which precedes the current bottom field in coding order, the predicting the degree of motion may include: counting a first count and a second count, the first count being the number of blocks that are coded in intra coding and the second count being the number of blocks that are coded in coding other than intra coding; and calculating one of a ratio of the first count to the second count and a difference of the first count and the second count as the degree of motion of the current bottom field.

With this configuration, the degree of motion of the current bottom field can be predicted with simple process by counting the first count and the second count from among the information which can be easily obtained in the coding process of the specific field (here, the top field preceding the current bottom field in coding order). The degree of motion can be properly predicted as a ratio (or a difference) of the first count and the second count, or a ratio (or a difference) of the number of the blocks coded in intra coding and the blocks coded in other coding.

Here, the setting the reference picture candidates may include: comparing one of the ratio of the first count to the second count and the difference of the first count and the second count to a threshold; and setting one of the temporally nearest field and the spatially nearest field in the reference picture candidates based on the comparison result.

With this configuration, the reference picture candidate can be properly set with a simple comparison process using the threshold.

Here, the specific field may be a bottom field in a field pair which precedes, by N field pairs in coding order, the field pair to which the current bottom field belongs, where N is selected from 0 to 3.

With this configuration, the motion of the current bottom field can be easily predicted by using a bottom field in a field pair which is N field pair previous to, in coding order, the field pair to which the current bottom field belongs.

Here, the specific field may be one of a first field and a second field, the first field may be a bottom field in a field pair which precedes the current bottom field in coding order, the second field may be a top field in the field pair, in the predicting the degree of motion, a first and second correlations may be calculated as the degrees of motion, the first correlation may be a correlation between the current bottom field and the first field, and the second correlation may be a correlation between the current bottom field and the second field, and in the setting the reference picture candidates, the reference picture candidates may be set based on one of a ratio of the first correlation to the second correlation and a difference of the first correlation and the second correlation.

With this configuration, the motion of the current bottom field can be easily predicted by calculating the first correlation and the second correlation.

Here, in the setting the reference picture candidates, one of a temporally nearest field and a spatially nearest field is set in the reference picture candidates based on one of the ratio of the first correlation to the second correlation and the difference of the first correlation and the second correlation.

With this configuration, the reference picture candidates are properly set with simple process such as a comparison between the two correlations.

Here, the specific field may be one of a first field and a second field, the first field may be a top field in a field pair which precedes the current bottom field in coding order, the second field may be a bottom field in the field pair, the predicting the degree of motion may include: generating reduced size images of the first field, the second field and the current bottom field respectively; estimating a motion of the current bottom field from the first field using the reduced size images of the first field and the current field; and estimating a motion of the current bottom field from the second field using the reduced size images of the second field and the current field.

With this configuration, the motion of the current bottom field can be easily predicted by estimating the motion using reduced size images of the bottom fields of the first, the second and the current field.

Here, in the setting the reference picture candidates, one of the temporally nearest field and the spatially nearest field may be set in the reference picture candidates according to the two estimated motions.

With this configuration, the reference picture candidates are properly set with simple process such as a comparison between the motions which are obtained using the reduced-size images.

Here, the current bottom field may be in a field pair from which a picture coded in bi-predictive inter picture coding can be referred, in the setting of the reference picture candidates, one of a first subset and a second subset each of which includes the reference picture candidates selected from all pictures available for reference may be selected based on the predicted degree of motion, the first subset may include a temporally nearest field and may not include a spatially nearest field, the second subset may include the spatially nearest field and may not include the temporally nearest field, the temporally nearest field may be a top field in the same field pair as the current field, and the spatially nearest field may be a bottom field in the previous field pair coded in bi-predictive coding.

With this configuration, a subset which is more suitable can be adaptively set as the reference picture candidates from the first subset and the second subset according to the predicted motion.

Here, the reference picture selection method may include assigning a reference index of the least bits in the case where the reference picture candidate includes a temporally nearest field, and assigning a reference index of the least bits in the case where the reference picture candidate includes a spatially nearest field.

With this configuration, the temporally nearest field or the spatially nearest field which are likely to be used most as the reference picture candidates are referred to by the least-bit reference index, thereby improving the coding efficiency.

In addition, the image coding method, the program, the semiconductor device, the image coding apparatus and the stream data according to the present invention are configured in the same manner as described above, and have the same advantageous effects.

EFFECTS OF THE INVENTION

According to the present invention, it is possible to reduce amount of process for selecting a reference picture when coding interlaced video, and it is possible to achieve approximately the same coding efficiency as in the case where there is no limit on the reference picture candidates.

BRIEF DESCRIPTION OF DRAWINGS

FIG. 1 is a diagram showing a field picture pair.

| Numerical References |
| --- |
| 101 Input picture memory |
| 102 Subtractor |
| 103 Orthogonal transformation/quantization unit |
| 104 Variable length coding unit |
| 107 Inverse orthogonal transformation/inverse quantization unit |
| 108 Reference picture generation unit |
| 109 Reference picture memory |
| 110 Inter prediction unit |
| 111 Control unit |
| 304, 298, 292 First reference pictures |
| 308, 302, 296 Second reference pictures |
| 310 Spatially nearest field |
| 314 Temporally nearest field |
| 316 Current bottom field |

BEST MODE FOR CARRYING OUT THE INVENTION

First Embodiment

The reference picture selection method according to the present information predicts a degree of motion of a current bottom field to be coded using a specific field which precedes the current bottom field in coding order, sets a reference picture candidate suitable for coding the current bottom field according to the predicted degree of motion, and selects a reference picture for the current bottom field from among the set reference picture candidates. When selecting the reference picture, it is not necessary to search all available reference pictures, but only reference picture candidates may be searched. This reduces the amount of process for determining the reference picture. In addition, based on the predicted degree of motion, the reference picture candidates suitable for coding the current bottom field is set, and thus the approximately same coding efficiency can be achieved as in the case where there is no limit on the reference picture candidates.

Figure 5:
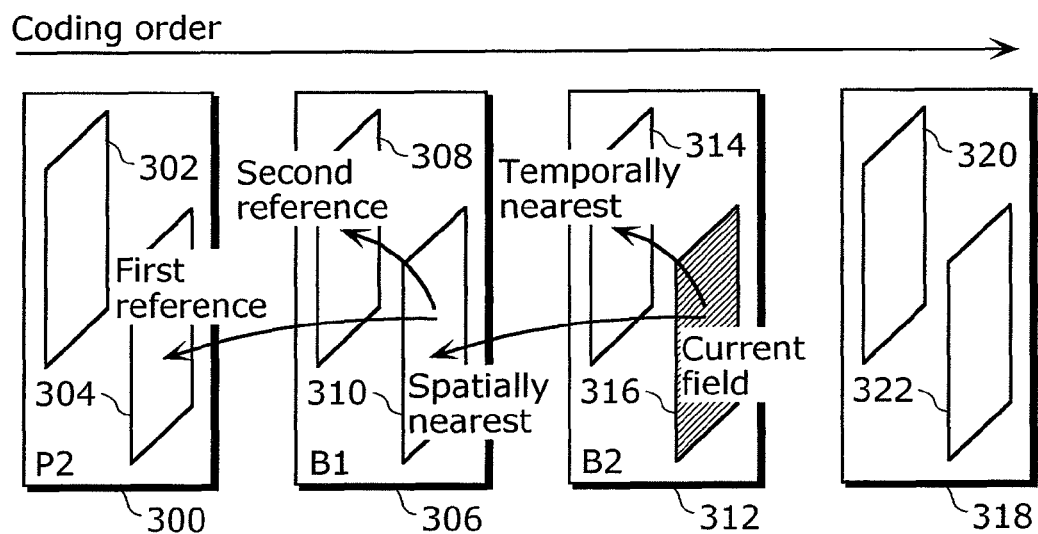
FIG. 5 shows an example of pictures (coding order) related to a reference picture selection method and the image coding apparatus.

Different pictures are defined as the specific field for each of the embodiments. In the first embodiment, the specific field represents the bottom field in a field pair preceding the current bottom field in coding order. For example, in the case where the bottom field 316 in FIG. 5 is the current field to be coded, the bottom field 310 is defined as the specific field. The top field in the same field pair as the specific field is referred to as the second reference picture. The bottom field in the previous field pair in coding order is referred to as the first reference picture. For example, when the bottom field 310 is the specific field, the top field 308 is the second reference picture, and the bottom field 304 is the first reference picture.

In addition, the prediction of the motion degree of the current bottom field is performed indirectly. More specifically, in the prediction above, when coding the specific field, a first count and a second count are counted, the first count being the number of blocks that are coded using the first reference picture and the second count being the number of blocks that are coded using the second reference picture; and one of a ratio of the first count to the second count and a difference of the first count and the second count is calculated as the degree of motion of the current bottom field. It indicates that, the smaller the ratio or the difference is, the larger the motion becomes.

Note that the first and second reference pictures in FIG. 5 are reversed the first and second reference pictures in the Claims. Here, note that the ratio or the difference of the first count number and the second count number is reversed. More specifically, by reversing the term for the first and the second reference pictures, the motion may be small or large when the larger the ratio or the difference becomes. The same effect can be achieved in predicting the motion even when the terms for the first and the second reference pictures are reversed.

Figure 2A:
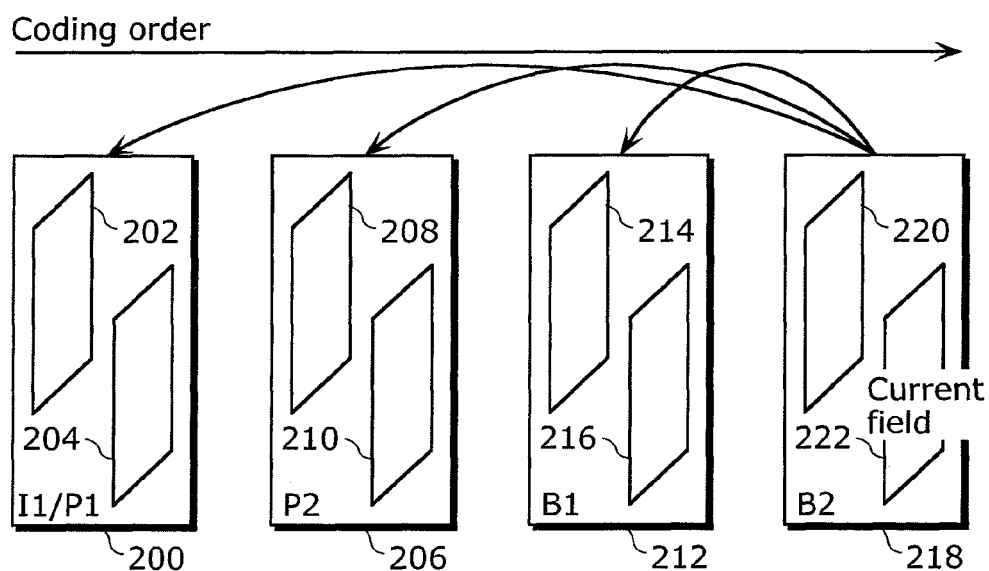
FIG. 2A shows an example of pictures in coding order.
Figure 2B:
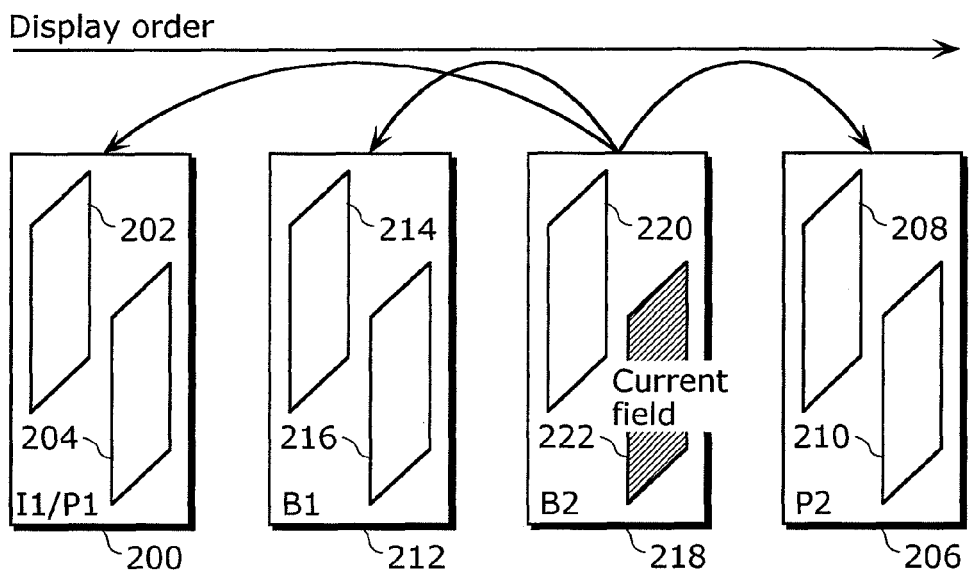
FIG. 2B shows the pictures in FIG. 2A in display order.
Figure 3A:
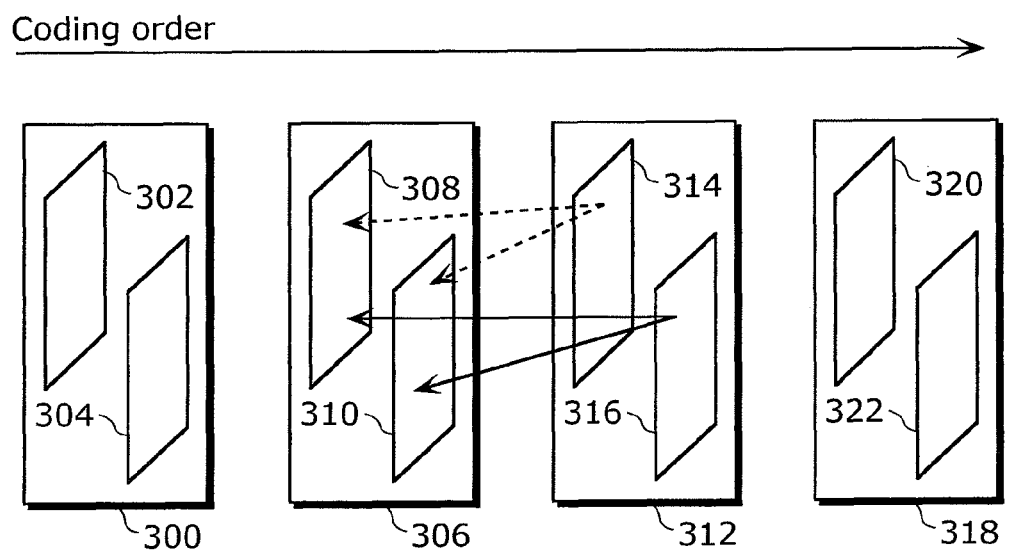
FIG. 3A shows an example of the first subsets which include reference picture candidates.
Figure 3B:
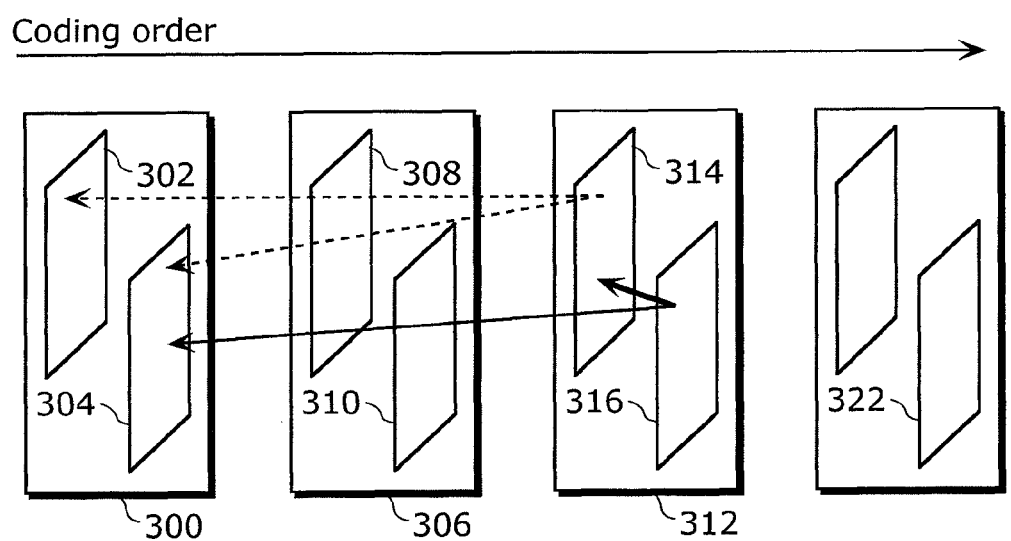
FIG. 3B shows an example of the second subsets which include reference picture candidates.

FIG. 3A and FIG. 3B show an example of the first and second subsets which include reference picture candidates. In FIG. 3A, the arrow lines in solid lines show the first subset which includes reference picture candidates used for coding the current bottom field 316. In FIG. 3B, the arrow lines in solid lines show the second subset which includes reference picture candidates used for coding the current bottom field 316. When setting the reference picture candidates, the first subset or the second subset is set according to the predicted degree of the motion.

The top field 314 is the nearest field of the current bottom field 316 in time (hereinafter referred to as a temporally nearest field). When the predicted motion is large, it is desirable to set the temporally nearest field as the reference picture candidate. The bottom field 310 is the nearest field of the current bottom field 316 in space (hereinafter referred to as the spatially nearest field). When the predicted motion is small, it is desirable to set the spatially nearest field as the reference picture candidate.

The examples shown in FIG. 3A and FIG. 3B, the first subsets include the spatially nearest fields, but not the temporally nearest fields. The second subsets include the temporally nearest fields, but not the spatially nearest fields. Note that the arrow lines in broken line in FIG. 3A and FIG. 3B shows the subsets including reference picture candidates used for coding the top field 314. As shown in the diagrams, the subsets for coding the top field 314 may be selected in connection with the first and second subsets of the bottom fields.

Figure 3C:
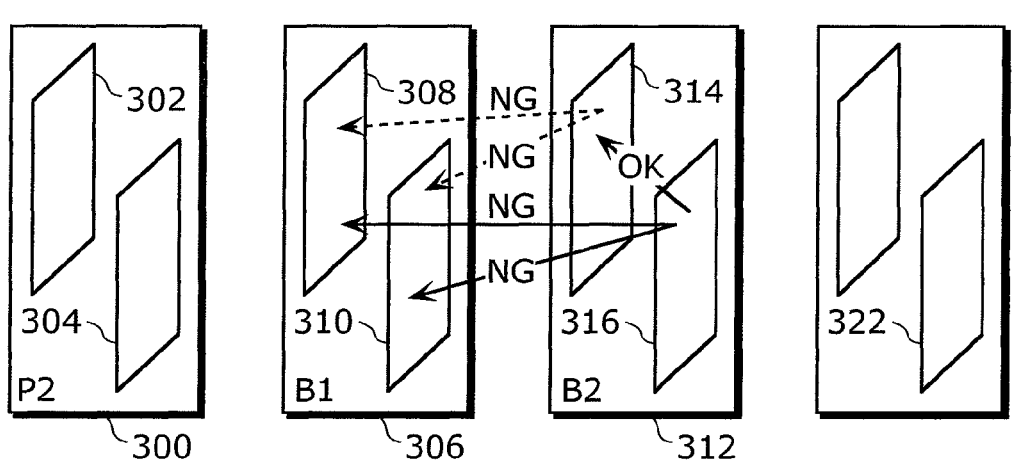
FIG. 3C shows an example of pictures excluded from the reference picture candidates in the second subset.

FIG. 3C shows an example of pictures excluded from the reference picture candidates in the second subset. The arrow lines in solid line with NG in the diagram indicate that it is desirable to exclude the fields 308 and 310 from the second subset. With this, when coding the current bottom field, the field pair 306 can be deleted from the reference picture memory since the field pair 306 is no longer necessary as the reference pictures. In addition, the arrow lines in broken line with NG in the diagram indicate that the fields 308 and 310 may be excluded from the subset for coding the top field 314. With this, when coding the top field 314, the field pair 306 can be deleted from the reference picture memory.

Note that the number of reference picture candidates in the first and the second subsets may be two or more. Furthermore, the spatially nearest field may be included in both subsets, while the temporally nearest field may be included in one of the subsets.

The image coding apparatus which performs the reference picture selection method according to the first embodiment will be described.

Figure 4:
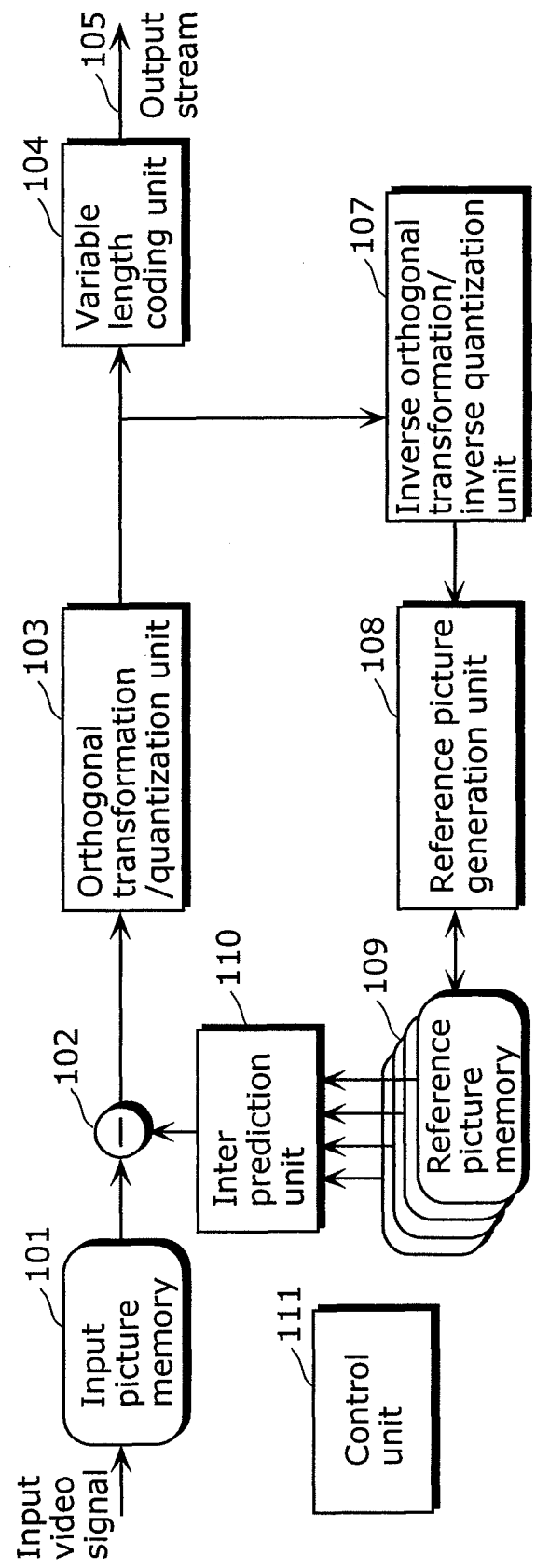
FIG. 4 is a block diagram showing the configuration of the main parts of the image coding apparatus according to the first embodiment.

FIG. 4 is a block diagram showing the configuration of the main components of the image coding apparatus according to the first embodiment. As shown in the diagram, the image coding apparatus includes an input picture memory 101, a subtractor 102, an orthogonal transformation/quantization unit 103, a variable length coding unit 104, an inverse orthogonal transformation/inverse quantization unit 107, a reference picture generation unit 108, a reference picture memory 109, an inter prediction unit 110 and a control unit 111.

Interlaced video signals are inputted to the input picture memory 101, and the input picture memory 101 temporary holds at least one field pair.

The subtractor 102 computes a difference between the current block to be coded from the input picture memory 101 and the predictive image from the inter prediction unit 110, and outputs the difference to the orthogonal transformation/quantization unit 103 as a prediction residual.

The orthogonal transformation/quantization unit 103 computes a coefficient block which includes a frequency coefficient by orthogonal transformation of the prediction residual from the subtractor 102, and quantizes the coefficient block.

The variable length coding unit 104 outputs a video stream by variable coding of the quantized coefficient block.

The inverse orthogonal transformation/inverse quantization unit 107 computes the prediction residual by inverse quantization of the quantized coefficient block and inverse orthogonal transformation.

The reference picture generation unit 108 reconstructs the current picture by adding the prediction residual from the inverse orthogonal transformation/inverse quantization unit 107 and the predictive picture from the inter prediction unit 110.

The reference picture memory 109 temporary stores the reconstructed current picture as a reference picture.

The inter prediction unit 110 generates a predictive image by single-prediction or bi-prediction, per block of the current picture, using the reference picture in the reference picture memory 109. Here, the inter prediction unit 110 selects one or two reference picture per block from the reference picture candidates set by the control unit 111 based on the reference picture selection method.

The control unit 111 controls the entire image coding apparatus, and particularly sets reference picture candidates based on the reference picture selection method.

FIG. 5 shows an example of pictures (coding order) related to the reference picture selection method and the image coding apparatus. The field pairs 300, 306 312 and 318 are single-predictive pictures or bi-predictive pictures. For example, the coding types of the field pairs 300, 306 312 and 318 are P, B, B, B, respectively. It is assumed that the field pairs 300 and 306 are coded, and have been stored in the reference picture memory 109 as reference pictures. The field pair 312 is the current field pair to be coded. There may be one or more non-reference field pair between the field pairs 300 and 306, or between the field pairs 306 and 312.

Prediction information from the bottom field 310 in the previous reference field pair 306 in coding order is analyzed in order to predict the degree of motion in the current field indirectly. The analysis result indicates the degree of the motion in the field to be coded, and is used for determining whether the spatially nearest field or temporally nearest field is more suitable for coding the bottom field 316 in the current field pair 312.

In coding the bottom field 310 in the previous reference field pair 306, the first and second reference pictures indicated below are available as the reference picture candidates: the bottom field 304 (hereinafter referred to as the first reference picture) in the reference field pair 300 preceding the previous reference field pair 306 and the top field 308 (hereinafter referred to as the second reference picture) in the previous reference field pair 306. The determination on the spatially nearest or the temporally nearest field is used for determining whether the top field 314 in the target field pair is excluded when coding the bottom field 316 in the current field pair 312.

Note that the determination may be used later when coding the subsequent field pairs (such as the field pair 318) following the current field pair 312 in coding order.

Figure 6:
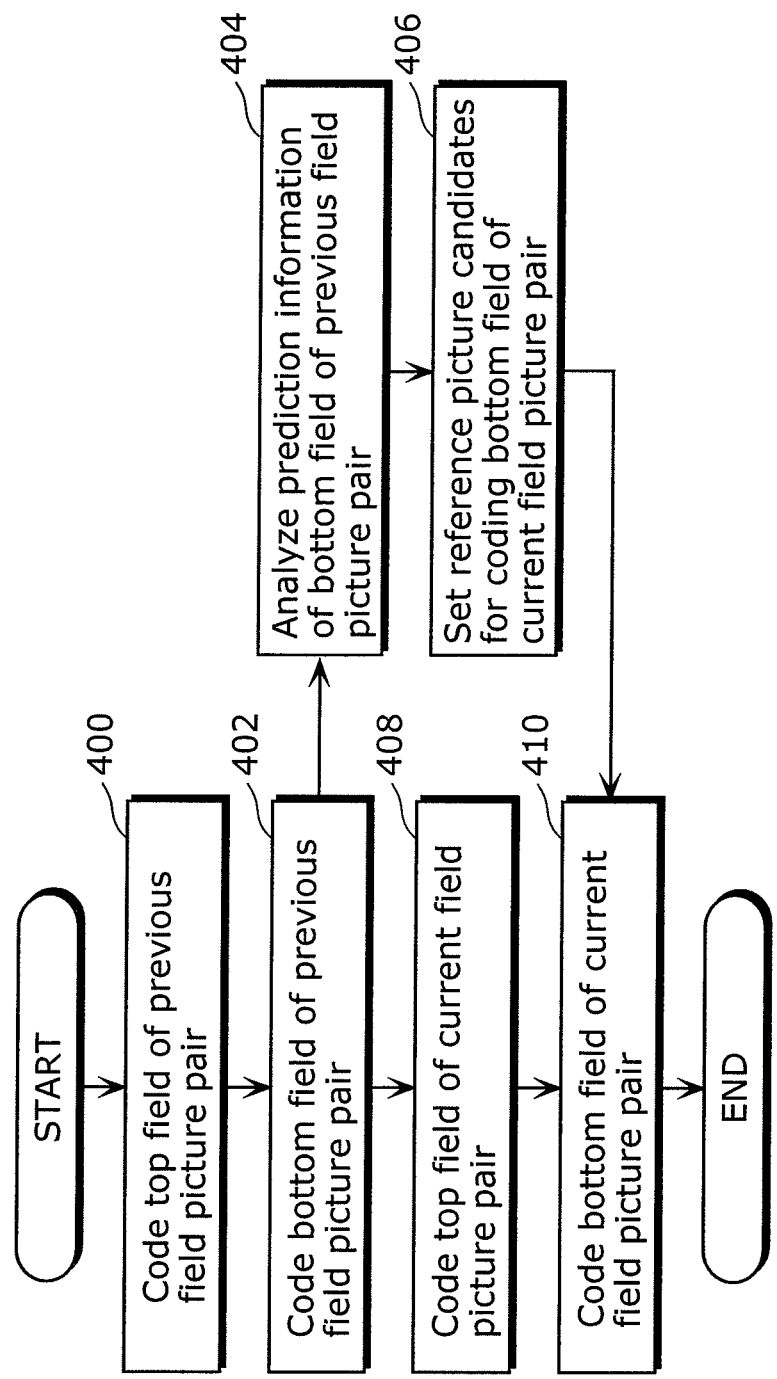
FIG. 6 is a flowchart showing coding and reference picture setting process in the image coding apparatus.

FIG. 6 is a flowchart showing coding and reference picture setting processes in the image coding apparatus. FIG. 6 shows coding process in the fields 308, 310, 314 and 316 shown in FIG. 5, and process for setting the reference picture candidate by indirectly predicting the motions in the current field.

First, in the module 400, the top field 308 of the previous field pair 306 is coded. Next, in the module 402 the bottom field 310 of the previous field pair 306 in coding order is coded using the first and second reference pictures as reference picture candidates. Prediction information of the bottom field 310 is passed from the coding module 402 to the analysis module 404. This information may be passed after each macroblock or after each slice or after the entire field are coded.

The module 404 makes a spatial-temporal determination on whether the spatially nearest field or temporally nearest field is more suitable. The spatial-temporal determination in module 406, the top field 314 in the target field pair 312 (i.e. temporally nearest field) is included or excluded when coding the bottom field 316 in the current field pair 312. Then, in the module 408, the top field 314 of current field pair 312 is coded, whereas the bottom field 316 of current field pair 312 is coded using the reference picture candidates set in the module 406. In this coding, the most suitable reference picture is selected from the reference picture candidates per block.

Figure 7:
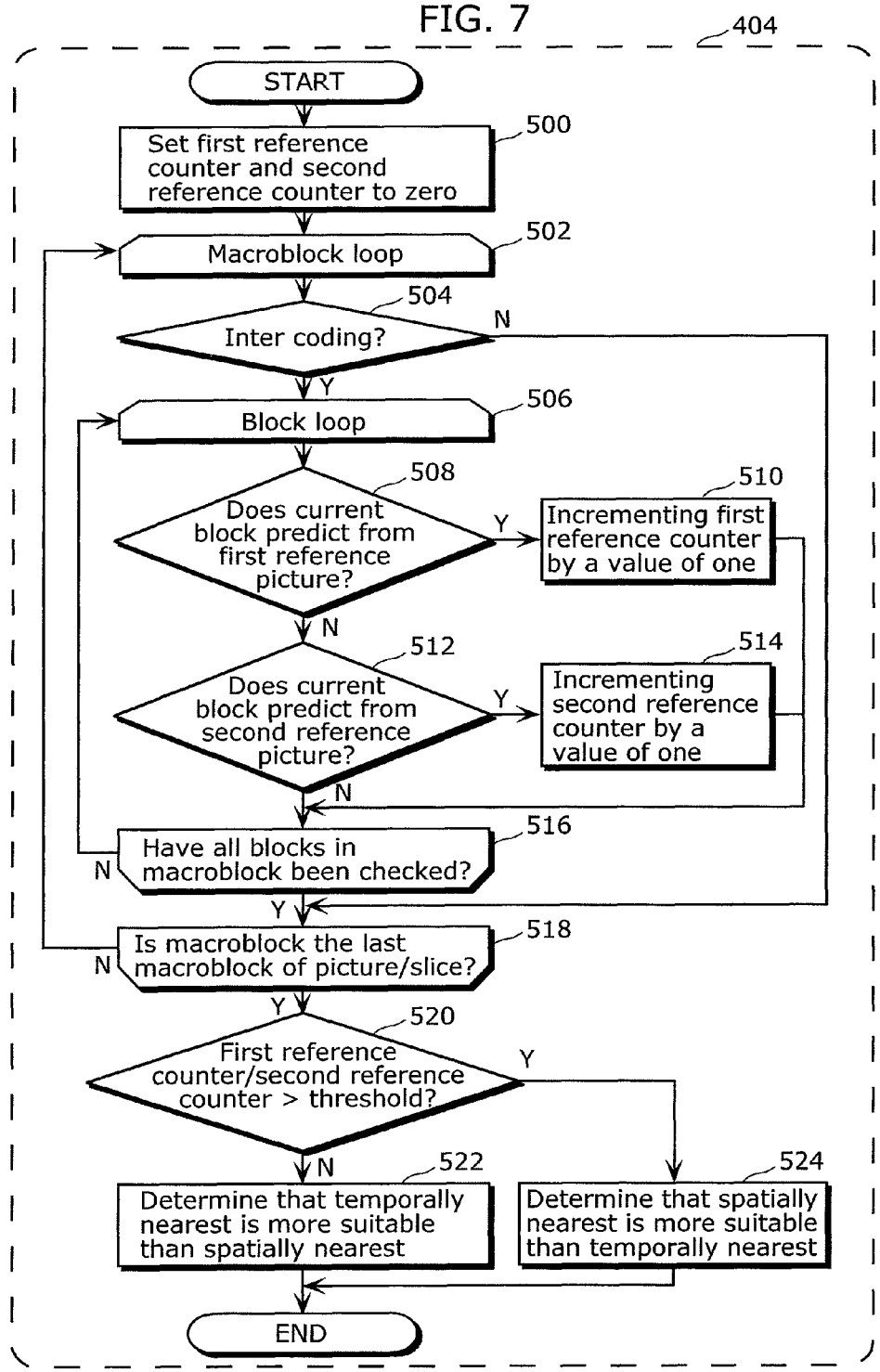
FIG. 7 is a flowchart showing the analysis in FIG. 6 in detail.

FIG. 7 is a flowchart showing the analysis of the module 404 in FIG. 6 in detail.

Firstly, the module 500 sets the first reference counter and second reference counter to the value of zero. Next, coding type of each macroblock in the input slice/picture is checked in the module 504. When the coding type is not inter-coding, the loop continues to the next macroblock in the picture, as shown in the module 518. When the coding type is inter-coding (single-predictive or bi-predictive), reference pictures used for each block in the macroblock is determined. A fixed size such as 4×4 or 8×8 is selected as the block size.

Module 508 checks whether a block predicts from the first reference field. In such a case, the first reference counter is incremented by the value of one in the module 510, and then the block loop continues to the next block in the macroblock. On the contrary, when a block does not predict from the first reference picture, in the module 512, it is determined whether the block is predicted from the second reference picture. In the case where the block is predicted from the second reference picture, the second reference counter is incremented by the value of one in the module 514, and then the block loop continues to the next block on the macroblock. This checking is repeated for all blocks of the macroblocks of the input slice/picture, as shown in the module 518.

After all macroblocks are checked, the ratio of first reference counter to second reference counter is compared to a threshold (hereinafter referred to as the first threshold) in the module 520. This ratio denotes the prediction result of the degree of motion in the current bottom field. In other words, it is predicted that the smaller the ratio is, the larger the motion in the current bottom field becomes, and the larger the ratio is, the smaller the motion in the current bottom field becomes. In the case where the ratio is smaller than the first threshold, it is determined that the temporally nearest field is more suitable for the reference picture candidate than the spatially nearest reference field. In contrast, in the case where the ratio is equal to or larger than the first threshold, it is determined that the spatially nearest field is more suitable for the reference picture candidate than the temporally nearest reference field. After the determination, the analysis process is terminated.

Note that in module 520, the difference between the value of the first reference counter and the value of the second reference counter may be used instead of the ratio. In this case, it is predicted that the smaller the difference is, the larger the motion in the current bottom field becomes, and the larger the difference is, the smaller the motion in the current bottom field becomes. In the case where the difference is smaller than the second threshold (different from the first threshold for the ratio), it is determined that the temporally nearest field is more suitable for the reference picture candidate than the spatially nearest field. On the other hand, in the case where the difference is equal to or larger than the second threshold, it is determined that the spatially nearest field is more suitable for the reference picture candidate than the temporally nearest reference field.

In the module 520, the ratio of the value of the first reference counter to the value of the second reference counter may be used instead of the ratio of second reference counter value to the value of the first reference counter. In this case, when the ratio of (the value of second reference counter/the value of first reference counter) is larger than a predetermined threshold, the temporally nearest field is determined to be more suitable, whereas when the ratio is smaller than the threshold, the spatially nearest field is determined to be more suitable.

Figure 8:
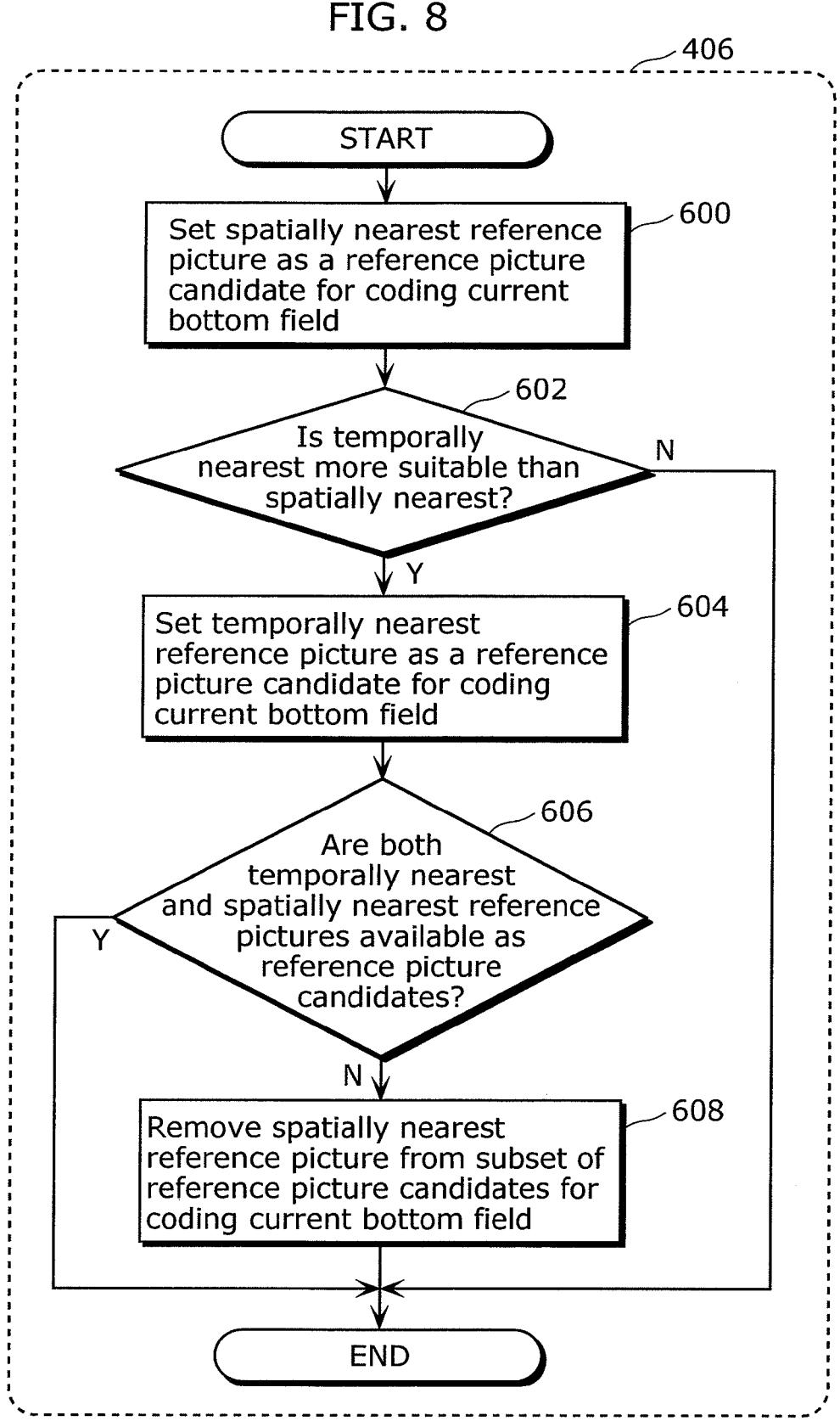
FIG. 8 is a flowchart showing reference picture candidate setting process in FIG. 6 in detail.

FIG. 8 is a flowchart showing the reference picture candidate setting process of the module 406 in FIG. 6 in detail.

First, module 600 sets the bottom field 310 of the previous field pair 306 in coding order (i.e. spatially nearest field) as a reference picture candidate for coding bottom field 316 of current field pair 312. In the case where the field pair immediately previous to the current field pair 312 is not a reference field pair (shown as field pair 306 in the example of FIG. 5), the bottom field of the nearest reference field pair preceding current field pair 312 in coding order is regarded as the spatially nearest reference field and is set as a reference picture candidate in the module 600.

Next, the spatial-temporal determination is checked in the module 602. When temporally nearest reference field is not suitable, the reference picture selection method is terminated. Otherwise (when temporally nearest field is more suitable), the top field 314 of the current field pair 312 (i.e. temporally nearest field) is set as a reference picture candidate in the module 604.

Furthermore, in the module 606, it is determined whether the spatially nearest field and the temporally nearest field is available or not as a reference picture candidate at the same time in terms of the specification, processing ability or setting of the image processing apparatus. In such a case, the reference picture selection method is terminated. Otherwise, in the module 608, the bottom field 310 (spatially nearest field) in the previous field pair 306 in coding order is excluded from the subset of the reference picture candidate, and the reference picture candidate setting method is terminated.

As described above, according to the reference picture selection method of the present invention, the degree of the motion in the current bottom field can be predicted with an easy process by counting the first and second counts based on the prediction information (information indicating the reference picture) which can be easily obtained from the coding process of the specific field (here, a bottom field in the field pair preceding the current bottom field).

The degree of motion can be properly predicted as a ratio (or a difference) of the first count and the second count, or a ratio (or a difference) of the number of times the first reference picture is referred to and the second reference picture is referred to. More specifically, it indicates that, the smaller the ratio or the difference is, the larger the motion becomes. In addition, with a simple comparison using the threshold, the reference picture candidate can be properly set.

With this, it is possible to reduce amount of process for selecting a reference picture, and it is possible to achieve approximately the same coding efficiency as in the case where there is no limit on the reference picture candidates.

Note that, in the module 406 in FIG. 6, the first subset or the second subset shown in FIG. 3A and FIG. 3B may be set.

In addition, the first reference picture and the second reference picture in FIG. 5 may be inverted. More specifically, the top field 308 may be the first reference picture, and the bottom field 304 may be the second reference picture. Here, Yes and No shown in the module 520 of FIG. 7 may be reversed. In this case, when the ratio in the module 520 (the value in the first reference counter/the second reference counter) is larger, it is predicted that the motion of the current bottom field is large, whereas when the ratio is smaller, it is predicted that the motion of the current bottom field is smaller.

Second Embodiment

The second embodiment differs from the first embodiment in that the specific field is a different picture and prediction information is different information. The same description is omitted and description will be made hereinafter focusing on the difference.

The specific field in the second embodiment represents the top field in a field pair previous to the current bottom field in coding order. In addition, in the first embodiment, the prediction information indicates whether the reference picture is the first reference picture or second reference picture when coding each block in the specific field, in the second embodiment, the information which indicates whether or not the reference picture is intra-coded or not when coding each block in the specific field.

The image coding apparatus according to the second embodiment has roughly the same configuration as the configuration shown in FIG. 4. In addition, FIG. 5 shows an example of pictures in coding order used for the adaptive reference picture selection method and the image coding apparatus as described in the first embodiment. In order to predict the degree of motion of the bottom field 316 of the current field pair indirectly, the prediction information when coding the top field 308 (i.e. specific field) of the previous reference field pair 306 in coding order is analyzed. This prediction information indicates whether each of the blocks of the specific field is intra-coded or not in coding. The analysis result indicates the degree of the current bottom field, and is used for spatial-temporal determination. The spatial-temporal determination is used for judging whether the top field 314 of the target field pair 312 (i.e. temporally nearest field) is included or excluded as a reference picture candidate when coding the bottom field 316 of the current field pair 312. Note that the determination may be used later when coding the subsequent field pairs (such as the field pair 318) following the current field pair 312 in coding order.

Figure 9:
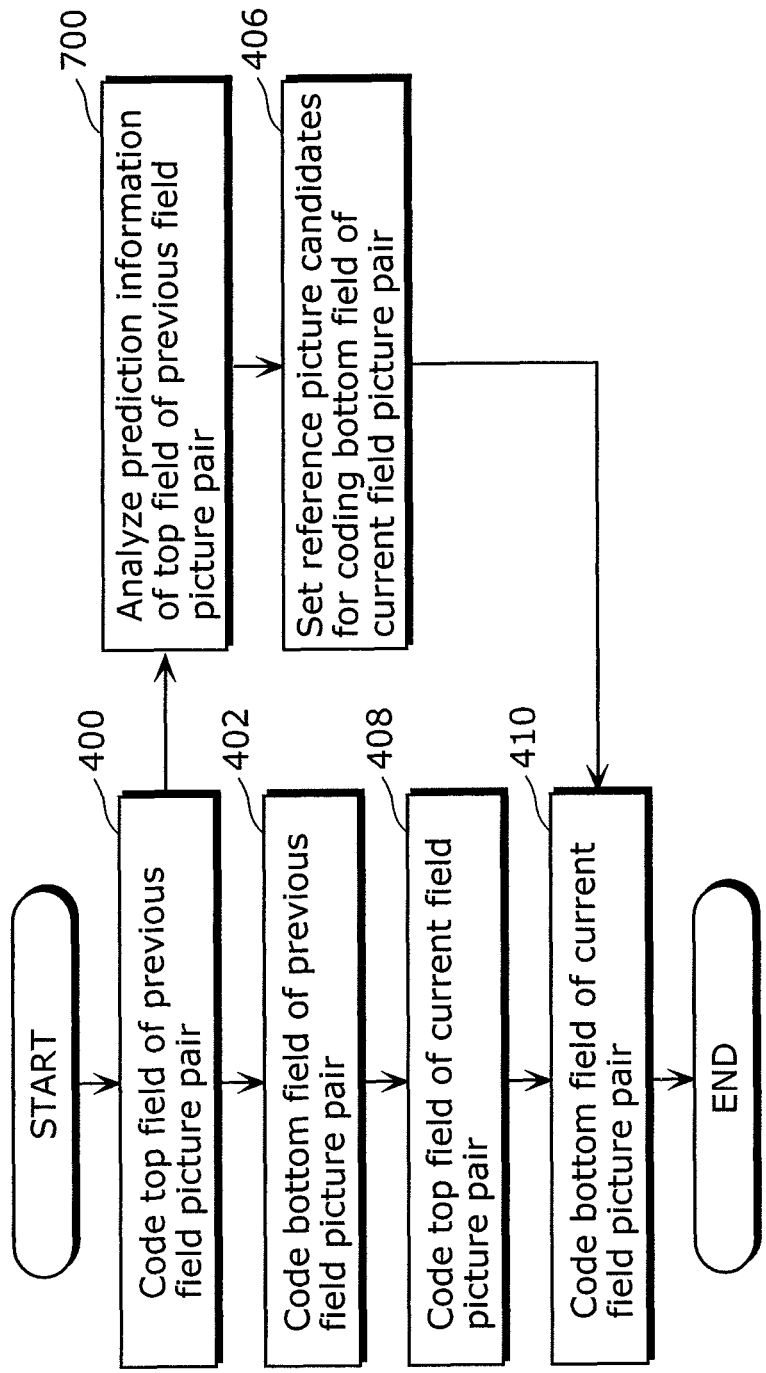
FIG. 9 is a flowchart showing coding and reference picture setting processes in the image coding apparatus according to the second embodiment.

FIG. 9 is a flowchart showing coding and reference picture setting processes in the image coding apparatus according to the second embodiment. FIG. 9 shows coding process in the fields 308, 310, 314 and 316 shown in FIG. 5, and process for setting the reference picture candidate by indirectly predicting the motions in the current field. The modules 400, 402, 408 and 410 are the same as the modules shown in FIG. 6 according to the first embodiment.

First, in the module 400, the top field 308 of the previous field pair 306 in coding order is coded. The prediction information in the top field 308 is passed from the coding module 400 to the analysis module 700. This prediction information indicates each block in the specific field is intra-coded or not when coding the specific field, and may be transferred after coding each macroblock or each slice or the entire field picture. The module 700 makes a spatial-temporal determination on whether the spatially nearest or temporally nearest reference picture is more suitable. Based on the spatial-temporal determination in the module 700, the module 406 includes or excludes the top field 314 of the current field pair 312 (i.e. temporally nearest field) as a reference picture candidate for coding of the bottom field 316 of the current field pair 312, and sets reference picture candidates (or subsets as shown in FIGS. 3A, 3B) according to the determination.

In the module 402, the bottom field 310 of the previous field pair 306 in coding order is coded, and in the module 408 the top field picture 314 of current field picture pair 312 is coded. Lastly, the module 410 codes the bottom field 316 of the current field picture pair 312 using the reference picture candidates set in the module 406.

Figure 10:
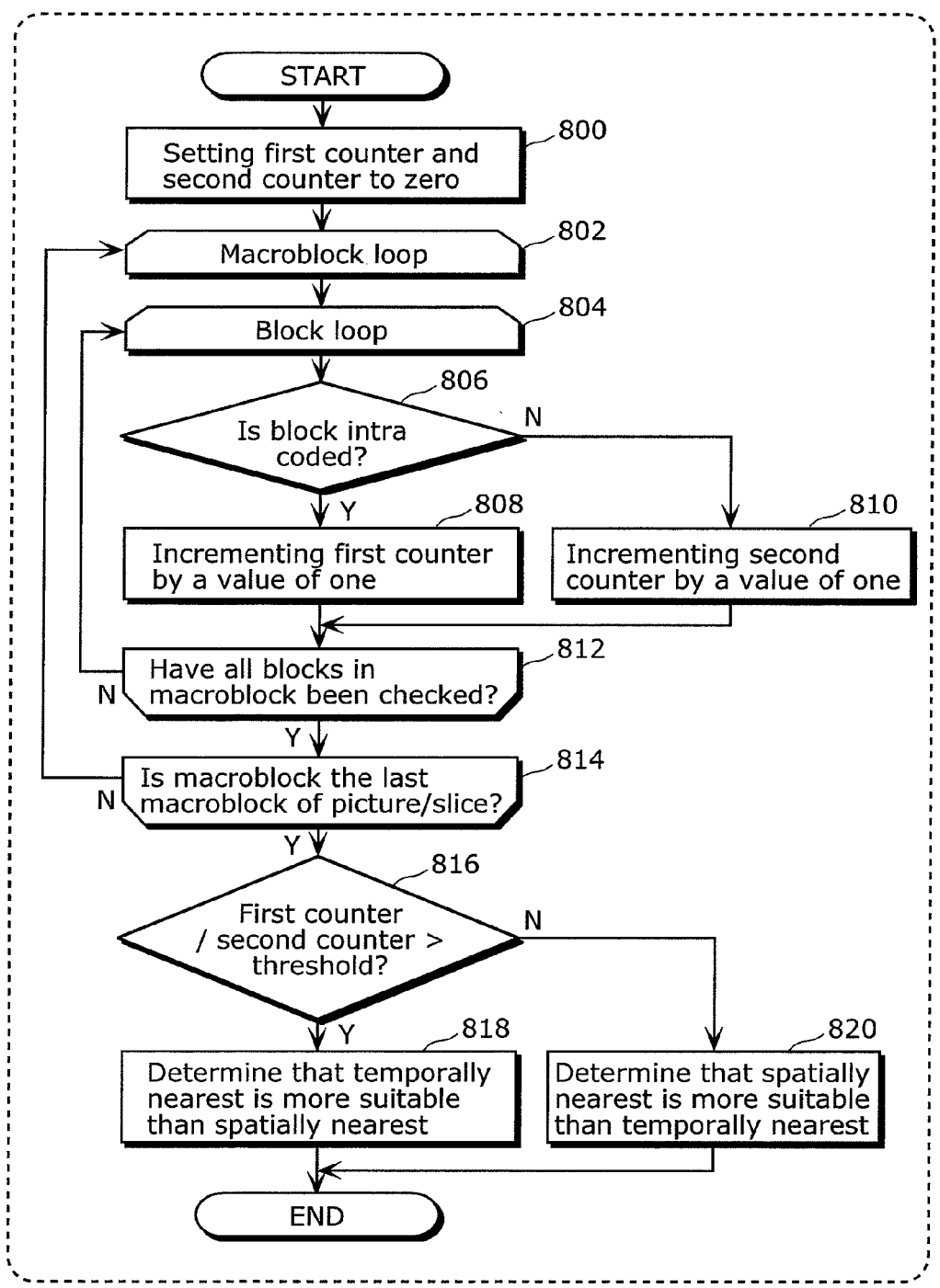
FIG. 10 is a flowchart showing the analysis process in FIG. 9 in detail.

FIG. 10 is a flowchart showing a detailed analysis process in the module 700 shown in FIG. 9.

Firstly, the module 800 sets the first counter and second counter to the value of zero. Next, coding type of each block of the macroblock in the input slice/picture is checked in the module 806. A fixed size such as 4×4 or 8×8 is selected as the block size. If the coding type is intra coding, the first counter is incremented by the value of one in the module 808, and then the block loop continues to the next block in the macroblock as shown in module 812. If the coding type is not intra coding, the first counter is incremented by the value of one in the module 810, and then the block loop continues to the next block in the macroblock as shown in the module 812. After all blocks in the macroblock are checked, the loop continues to the next macroblock in the slice/picture as shown in the module 814. After all macroblocks are checked, the ratio of first counter to second counter is compared to a threshold (hereinafter referred to as the third threshold) in the module 816. This ratio denotes the prediction result of the degree of the motion in the current bottom field. In other words, it is predicted that the smaller the ratio is, the larger the motion in the current bottom field becomes, and the larger the ratio is, the smaller the motion in the current bottom field becomes. The third threshold is different from the first threshold in the module 520 in the first embodiment. When the ratio is larger than the third threshold, it is determined that the temporally nearest reference field is more suitable than the spatially nearest reference field. On the other hand, when the ratio is no less than the third threshold, it is determined that the spatially nearest reference field is more suitable than the temporally nearest reference field. After the determination, the analyzing process is terminated.

Note that, in the module 816, a difference of the values of the first counter and the second counter may be used instead of the ratio. The difference denotes the prediction result of the degree of the motion in the current bottom field. More specifically, it is predicted that the larger the difference is, the larger the motion in the current bottom field becomes, and the smaller the difference is, the smaller the motion in the current bottom field becomes. In the case where the difference is smaller than the fourth threshold (which is different from the third threshold described above), it is determined that the temporally nearest field is more suitable for the reference picture candidate than the spatially nearest reference field. On the other hand, in the case where the difference is no more than the fourth threshold, it is determined that the spatially nearest field is more suitable for the reference picture candidate than the temporally nearest field.

As described above, according to the reference picture selection method of the present embodiment, the degree of the motion in the current bottom field is predicted indirectly by using prediction information (information indicating whether the coding is intra coding or not) usable in the process of coding a specific field (here, a top field in the previous bottom field). This facilitates simple process for properly setting the reference picture candidate.

Third Embodiment

The third embodiment differs from the second embodiment in that the specific field is a different picture. The same description is omitted and description will be made hereinafter focusing on the difference.

The specific field in the third embodiment represents the top field in the same field pair as the current bottom field.

The image coding apparatus according to the third embodiment has roughly the same configuration as the configuration shown in FIG. 4. In addition, as shown in the first and the second embodiments, FIG. 5 shows an example of pictures in coding order used for the adaptive reference picture selection method and the image coding apparatus as described in the first and second embodiments.

Prediction information obtained in coding the top field 314 (i.e. the specific field) in the current field pair 312 in coding order is analyzed in order to predict the degree of motion in the current bottom field 316 indirectly. The prediction information indicates whether each of the blocks of the specific field is intra-coded or not in coding. The analysis result indirectly indicates the degree of motion of the current bottom field 316, and is used for determining whether the spatially nearest field or the temporally nearest field is more suitable for the reference picture candidate (spatial-temporal determination).

Note that the determination may be used later when coding the field pairs following the current field pair 312 in coding order (such as the field pair 318).

Figure 11:
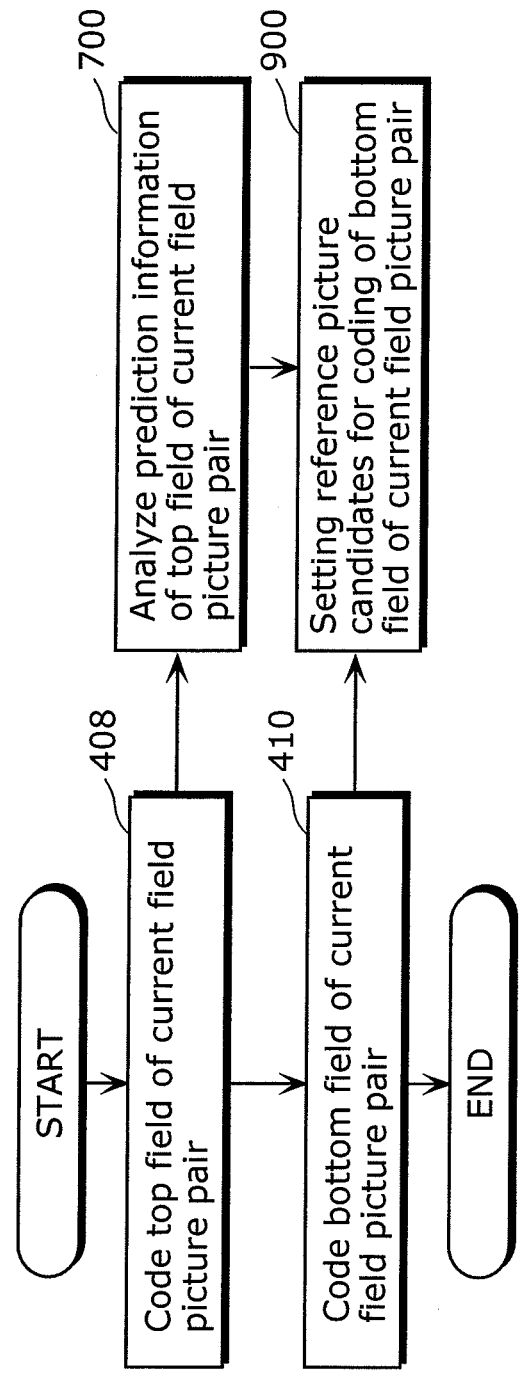
FIG. 11 is a flowchart showing coding and reference picture setting process in the image coding apparatus according to the third embodiment.

FIG. 11 is a flowchart showing coding and reference picture setting process in the image coding apparatus according to the third embodiment. FIG. 11 shows coding process in the fields 314 and 316 shown in FIG. 5, and process for setting the reference picture candidate by indirectly predicting the motion in the current field. The modules 408 and 410 are respectively the same as those of FIGS. 6 and 9 in the first and second embodiments. The module 700 is the same as that of FIGS. 9 and 10 in the second embodiment.

First, the top field 314 in the current field pair 312 is coded in the module 408. The prediction information of the top field 314 is transferred from the coding module 408 to the analysis module 700. The prediction information may be transferred after the coding of each macroblock, slice, or the entire field.

The module 700 makes a spatial-temporal determination on whether the spatially nearest field or temporally nearest field is more suitable. Based on the spatial-temporal determination in the module 700, the module 900 includes or excludes the top field 314 (i.e. temporally nearest field) of the current field pair 312 as a reference picture for coding of the bottom field 316 of the current field pair 312. Next, the module 410 codes the bottom field 316 of current field picture pair 312 using the reference picture candidates set in the module 900.

Figure 12:
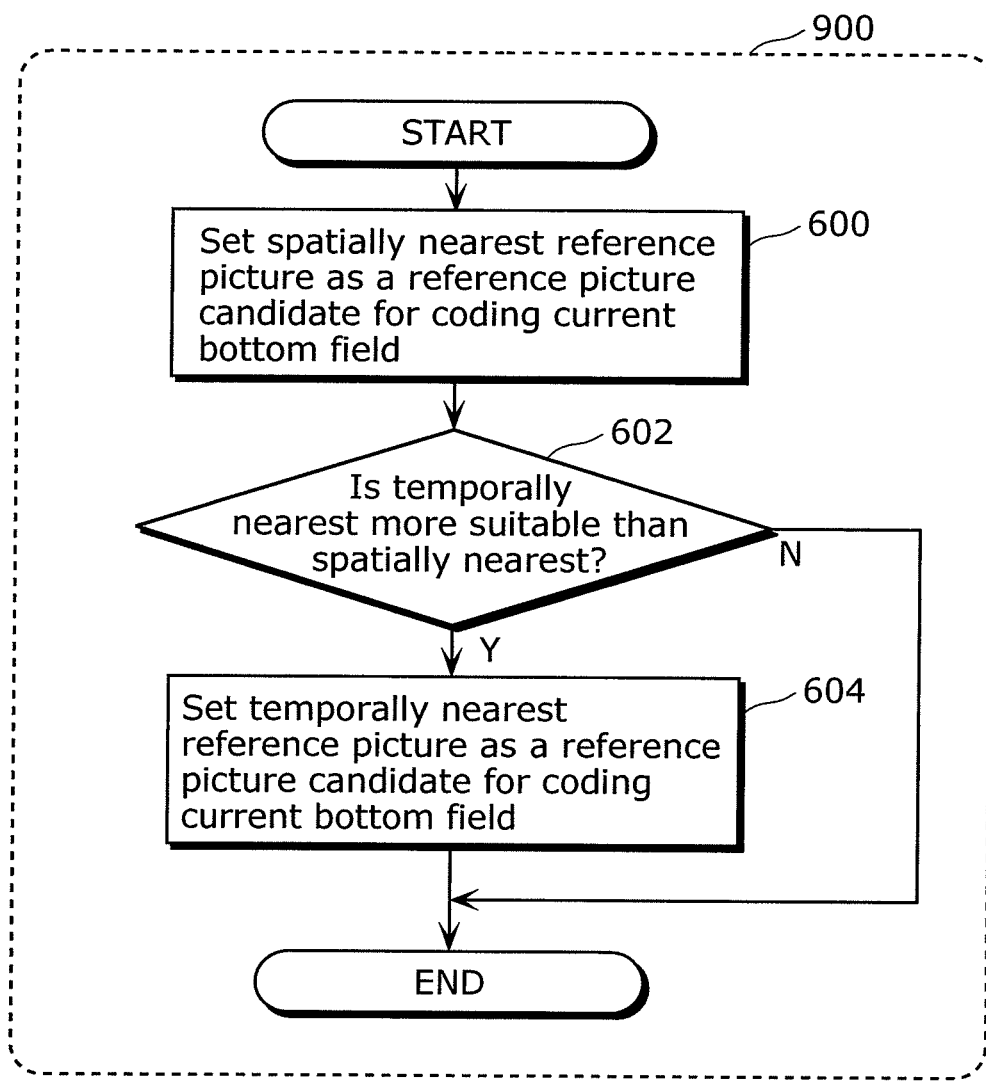
FIG. 12 is a flowchart showing reference picture candidate setting process in FIG. 11 in detail.

FIG. 12 is a flowchart showing the reference picture candidate setting processes the module 900 in FIG. 11 in detail.

First, the module 600 sets the bottom field 310 (i.e. spatially nearest field) of the previous field pair 306 in coding order as a reference picture candidate for coding the bottom field 316 of the current field pair 312. In the case where the field pair immediately preceding the current field pair 312 is not a reference field pair (shown as the field pair 306 in the example of FIG. 5), the bottom field of the nearest reference field pair preceding the current field pair 312 in coding order is regarded as the spatially nearest field and is set as a reference picture candidate in the module 600.

Next, the spatial-temporal determination is checked in the module 602. When the temporally nearest field is not suitable, the reference picture selection process is terminated. Otherwise (when the temporally nearest field is suitable), the top field 314 (i.e. the temporally nearest field) in the current field pair 312 is set as the reference picture candidate. The reference picture candidate setting process is then terminated. The modules 600, 602, and 604 are the same as those described in FIG. 8 in the first embodiment. FIG. 12 is different from FIG. 8 in that it does not exclude the spatially nearest picture is not excluded from the reference picture candidates since the modules 606 and 608 are not included. Thus, the final reference picture candidates are different in that the temporally nearest picture is included or excluded.

Note that in the module 900 in FIG. 11, the same process as shown in FIG. 8 may be performed instead of the process shown in FIG. 12

As described above, according to the reference picture selection method of the third embodiment, the degree of motion in the current bottom field is predicted indirectly by using prediction information (information indicating whether the coding is intra coding or not) easily usable in coding a specific field (here, the top field in the same field pair in the current bottom field). This facilitates simple process for properly setting the reference picture candidate.

Fourth Embodiment

In the fourth embodiment, a configuration which includes the respective reference picture selection methods in the first to third embodiments with process for assigning a reference index is added is described. Here, the reference index is a code used for all pictures available for reference or all of the reference picture candidates, and can be used for identifying a picture actually used as the reference picture in the stream. In addition, the reference index is a code used for all pictures available for reference or all of the reference picture candidates for each of the current pictures.

When assigning reference index, in the case where the reference picture candidates include a temporally nearest field, the temporally nearest field is referred to by the least-bit reference index, whereas, in the case where the reference picture candidates include the spatially nearest field, a spatially nearest field is referred to by the least-bit reference index. More specifically, the temporally nearest field or the spatially nearest field which are likely to be used most as a reference picture among the reference picture candidates is referred to by the least-bit reference index. The stream includes a reference index indicating the reference picture in each block, the bit number in the stream can be reduced, leading coding efficiency to be further improved.

Figure 13:
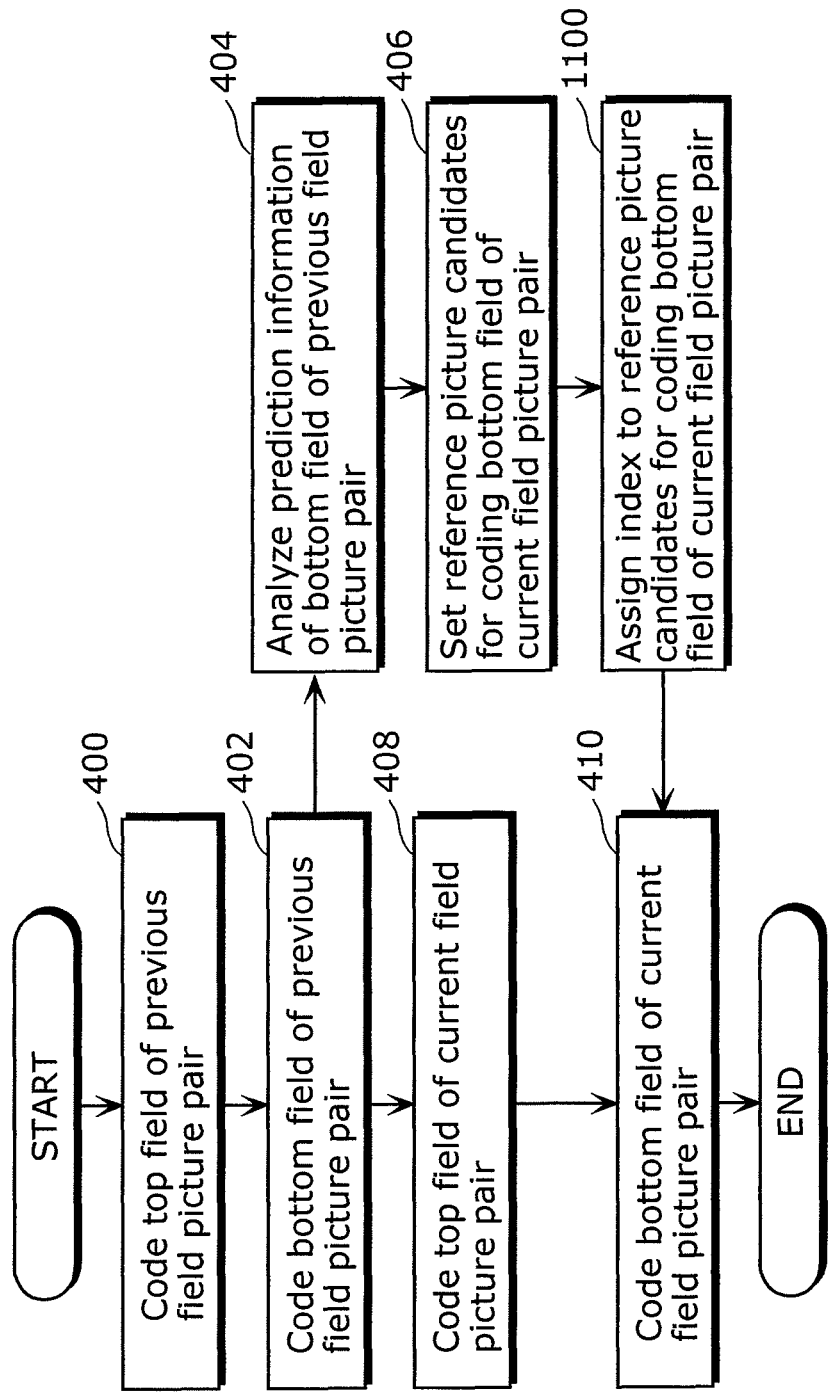
FIG. 13 is a flowchart showing coding and reference picture setting process in the image coding device according to the fourth embodiment.

FIG. 13 is a flowchart showing coding and reference picture setting process according to the fourth embodiment, which includes FIG. 6 in the first embodiment with the reference index assigning process added. FIG. 13 is different from FIG. 6 in that the module 1100 is added. The same description is omitted and description will be made hereinafter focusing on the difference. After the reference picture candidates are set, in the module 1100, reference index is assigned on each of the reference picture candidates in the current bottom field. Here, the temporally nearest field or the spatially nearest field among the reference picture candidates is referred to by the least-bit reference index.

Figure 14A:
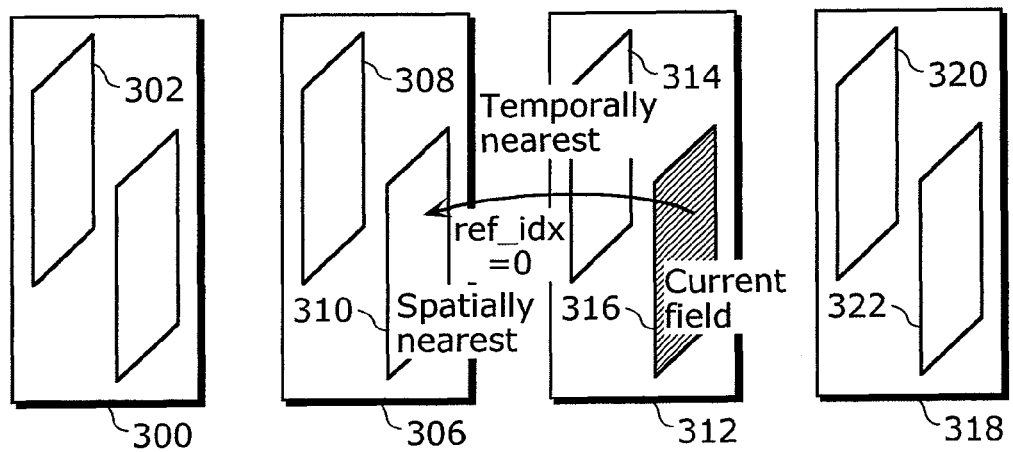
FIG. 14A shows an example of reference index ref_idx assigned to the spatially nearest field.
Figure 14B:
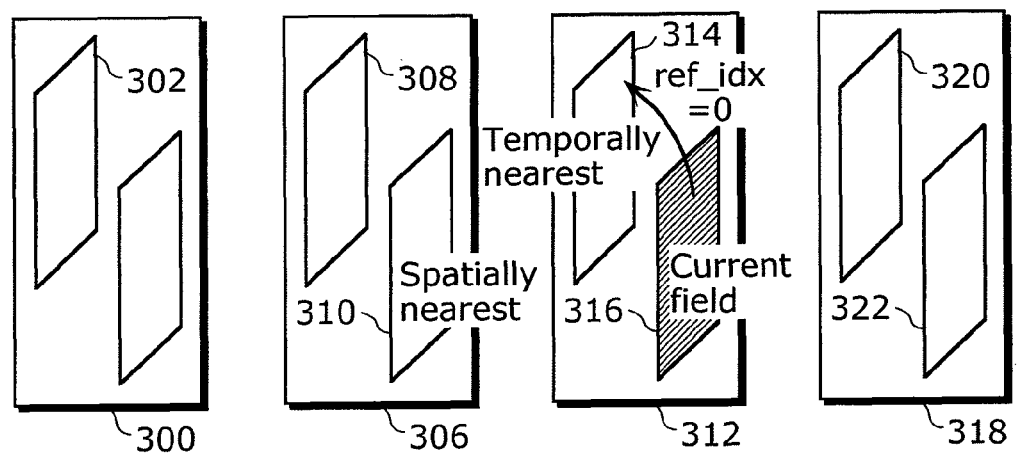
FIG. 14B shows an example of reference index ref_idx assigned to the temporally nearest field.

FIGS. 14A, 14B show examples of reference index ref_idx assigned. In FIG. 14A, the spatially nearest field 310 among the reference picture candidates of the current bottom field 316 is referred to as ref_idx=0. In this example, ref_idx=0 is a reference index denoted by the least bit. The reference picture candidates other than the spatially nearest field 310 are referred to by other values such as ref_idx=1, 2. In FIG. 14B, on the other hand, the temporally nearest field 314 among the reference picture candidate of the current bottom field 316 is referred to as ref_idx=0.

Figure 15:
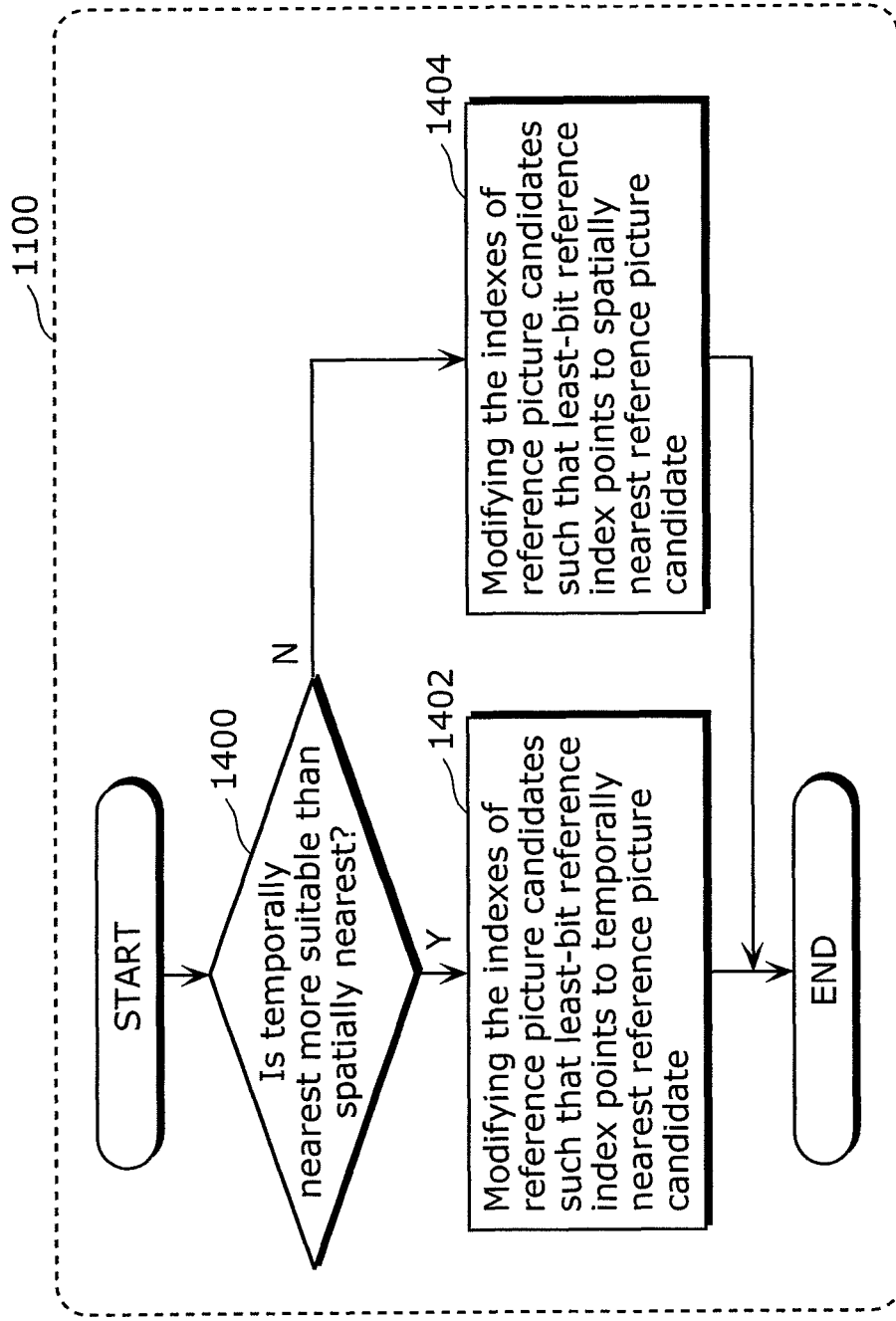
FIG. 15 is a flowchart showing the reference assigning index process in FIG. 13 in detail.

FIG. 15 is a flowchart showing the reference index assigning process in the module 1100 in FIG. 13 in detail.

First, the spatial-temporal determination is checked in the module 1400. In the case where the temporally nearest picture is suitable, in the module 1402, the reference indices of the multiple reference picture candidates are modified or rearranged so that the least-bit reference index refers to the temporally nearest picture (more specifically, the top field 314 in the current field pair 312) (for example, as shown in FIG. 14B). When the temporally nearest picture is not suitable, in the module 1404, the indices of multiple reference picture candidates are changed or rearranged so that the least-bit reference index refers to the spatially nearest picture (for example, FIG. 14A).

Figure 16:
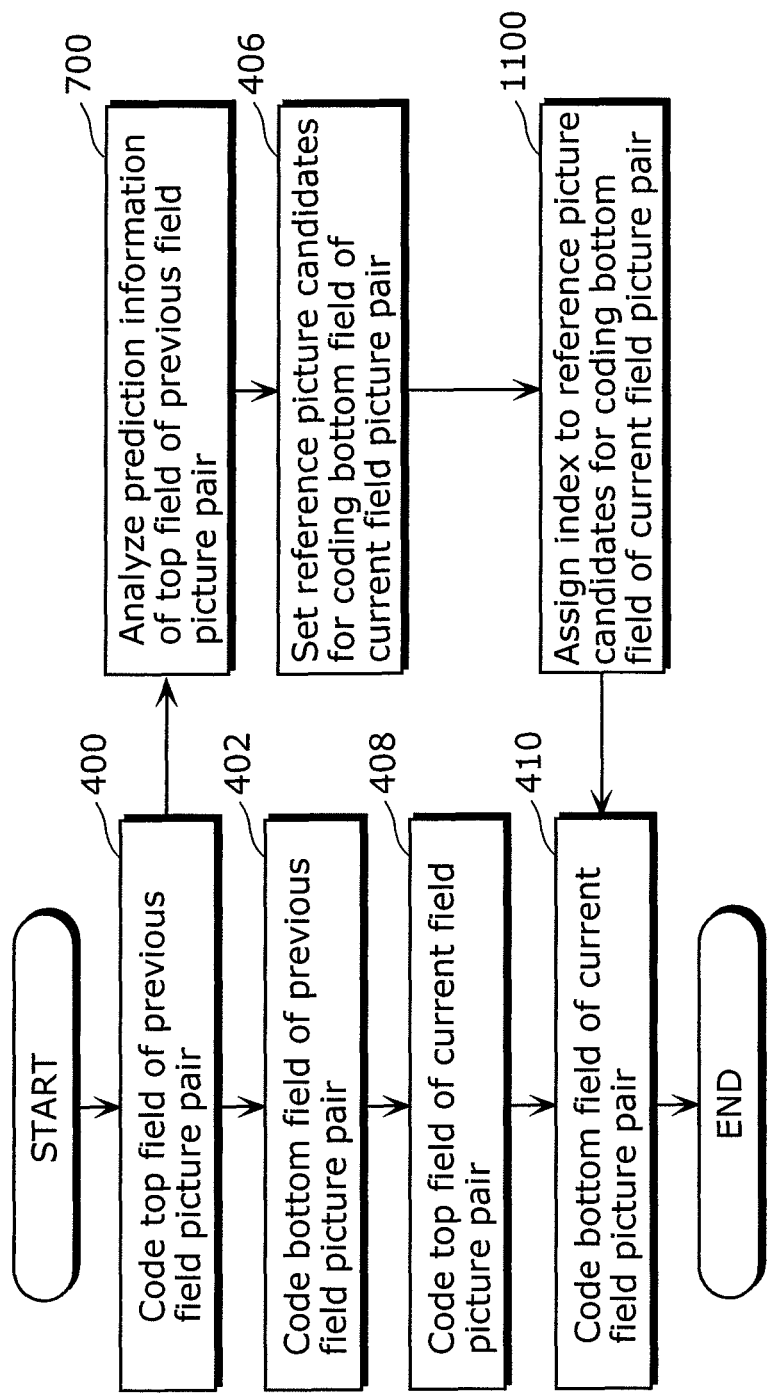
FIG. 16 is a flowchart showing another example of coding and reference picture setting process in the image coding device according to the fourth embodiment.

FIG. 16 is a flowchart showing another example of coding and reference picture setting process according to the fourth embodiment, which includes FIG. 9 in the second embodiment with the reference index assigning process added. FIG. 16 is different from FIG. 9 in that the module 1100 is added. The module 1100 is the same as the description above.

Figure 17:
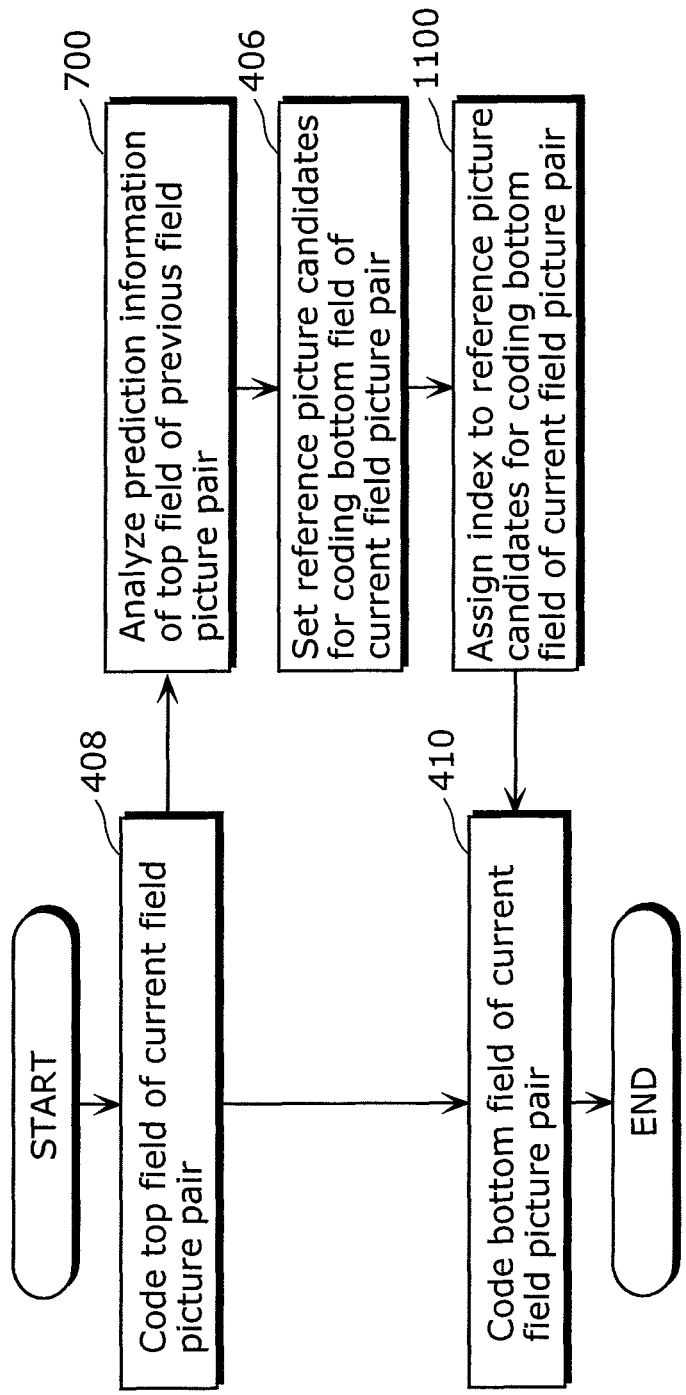
FIG. 17 is a flowchart showing another example of coding and reference picture setting process according to the fourth embodiment.

FIG. 17 is a flowchart showing another example of coding and reference picture setting process according to the fourth embodiment, which includes FIG. 11 in the third embodiment with the reference index assigning process added. FIG. 17 is different from FIG. 11 in that the module 1100 is added. The module 1100 is the same as the description above.

As described above, according to the reference picture selection method of the present invention, the temporally nearest field or the spatially nearest field which is likely to be used most as a reference picture among the reference picture candidates are referred to by the least-bit reference index The stream includes a reference indices indicating the reference picture in each block, the bit number in the stream can be shortened, leading coding efficiency to be further improved.

Fifth Embodiment

The fifth embodiment differs from the first embodiment in that the specific field is a different picture. The same description is omitted and description will be made hereinafter focusing on the difference.

The specific field in the fifth embodiment represents the top field in a field pair previous to the previous field pair (two field pairs preceding) of the current bottom field in coding order.

The image coding apparatus according to the third embodiment has roughly the same configuration as the configuration shown in FIG. 4.

Figure 18:
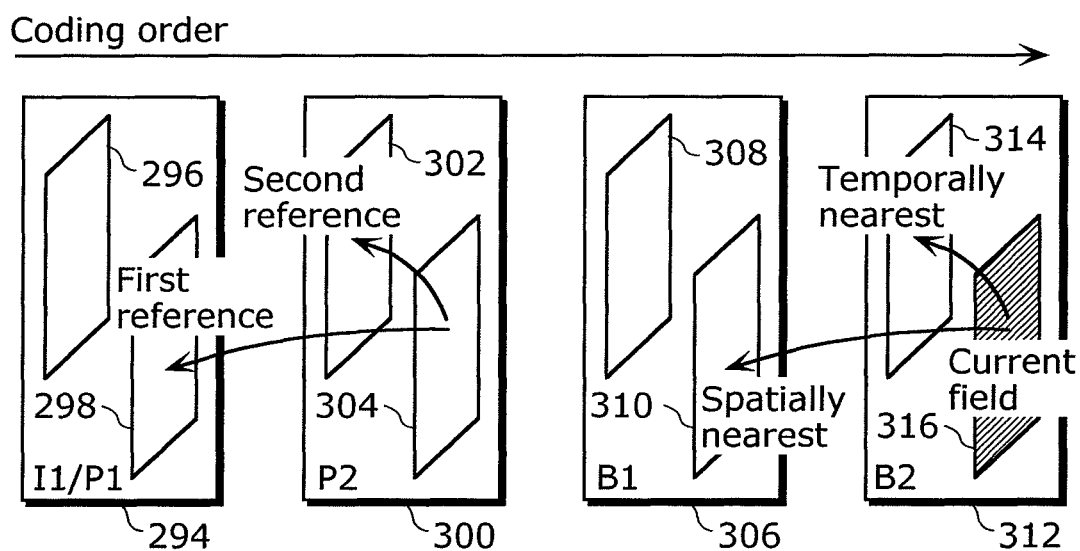
FIG. 18 shows an example of pictures in coding order used for the reference picture selection method and the image coding method according to the fifth embodiment.

FIG. 18 shows an example of pictures in coding order used for the reference picture selection method and the image coding method according to the fifth embodiment. The field pairs 294, 300, 306 and 312 are, for example, respectively P-picture, P-picture, B-picture, and B-picture. The bottom field 304 is the specific field for the current bottom field 316. The top field 302 in the same field pair as the specific field is referred to as the second reference picture. The bottom field 298 in the field pair 294 which is previous to the specific field 304 in coding order is referred to as the first reference picture.

Figure 19:
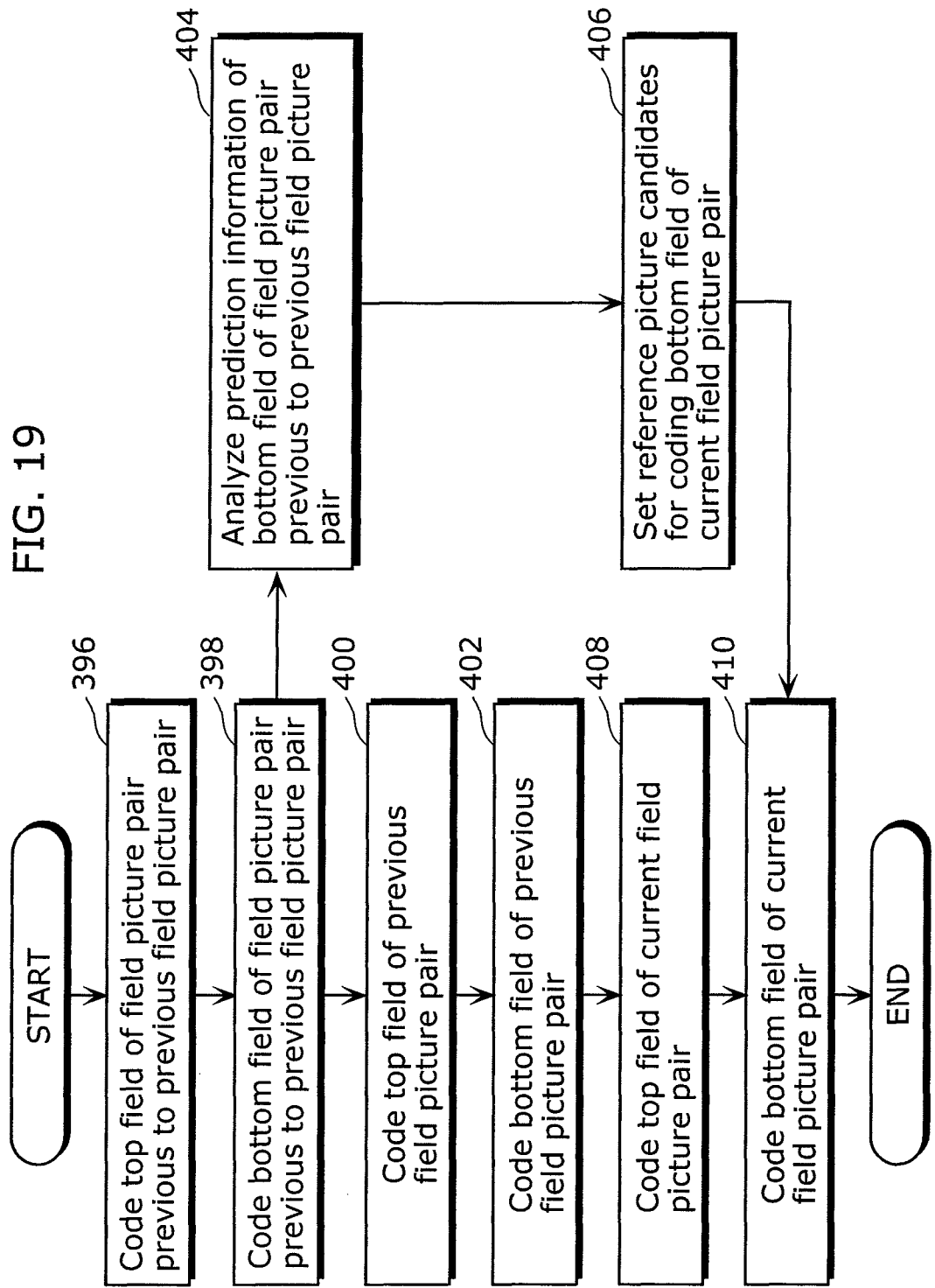
FIG. 19 is a flowchart showing coding and reference picture setting process in the image coding apparatus according to the fifth embodiment.

FIG. 19 is a flowchart showing coding and reference picture setting processes in the image coding apparatus. FIG. 19 shows coding process in the fields 302, 304, 308, 310, 314 and 316 and process for setting the reference picture candidate by indirectly predicting the motion in the current field. FIG. 19 is different from the reference picture setting process in the first embodiment shown in FIG. 6 in that the modules 396 and 398 are specified and that the module 404 obtains the prediction information from the module 398. The modules 400 to 410 in FIG. 19 perform the same process as described in FIG. 6. The same description is omitted and description will be made hereinafter focusing on the difference.

In the module 396, the top field 302 in the field pair 300 which is previous to previous field pair (two field pairs preceding) is coded. In the module 398, the bottom field 304 in the field pair 300 which is previous to previous field pair (two field pairs preceding) is coded. The prediction information in the bottom field 304 is transferred from the coding module 398 to the analysis module 404. The prediction information indicates a reference picture actually used for coding each block, and may be transferred after coding of each macroblock, each slice or the entire field picture.

In the module 404, the prediction information obtained from the module 398 is analyzed. The details of the modules 404 and 406 are the same as the description made in FIGS. 7 and 8.

As described above, according to the reference picture selection method of the fifth embodiment, in the same manner as in the first embodiment, the degree of motion in the current bottom field 316 can be predicted with simple process by counting the first and the second counts based on the prediction information which can be easily obtained in coding the specific field (here the bottom field 304 in the field pair which precedes the current bottom field in coding order).

The degree of motion can be properly predicted as a ratio (or a difference) of the first count to the second count, in other words, a ratio (or a difference) of the number of times the first reference picture is referred to, to the second reference picture is referred. It indicates that, the smaller the ratio or the difference is, the larger the motion becomes. In addition, with simple comparison using the threshold, the reference picture candidate can be properly set.

With this, it is possible to reduce amount of process for selecting a reference picture, and it is possible to achieve approximately the same coding efficiency as in the case where there is no limit on the reference picture candidates.

Sixth Embodiment

The sixth embodiment differs from the second embodiment in that the specific field is a different picture. The same description is omitted and description will be made hereinafter focusing on the difference.

The specific field in the sixth embodiment represents the top field in a field pair previous to the previous field pair (two field pairs preceding) the current bottom field in coding order.

The image coding apparatus according to the sixth embodiment has roughly the same configuration as the configuration shown in FIG. 4. The description will be made with reference to the example of pictures in coding order shown in FIG. 18 in the sixth embodiment.

Figure 20:
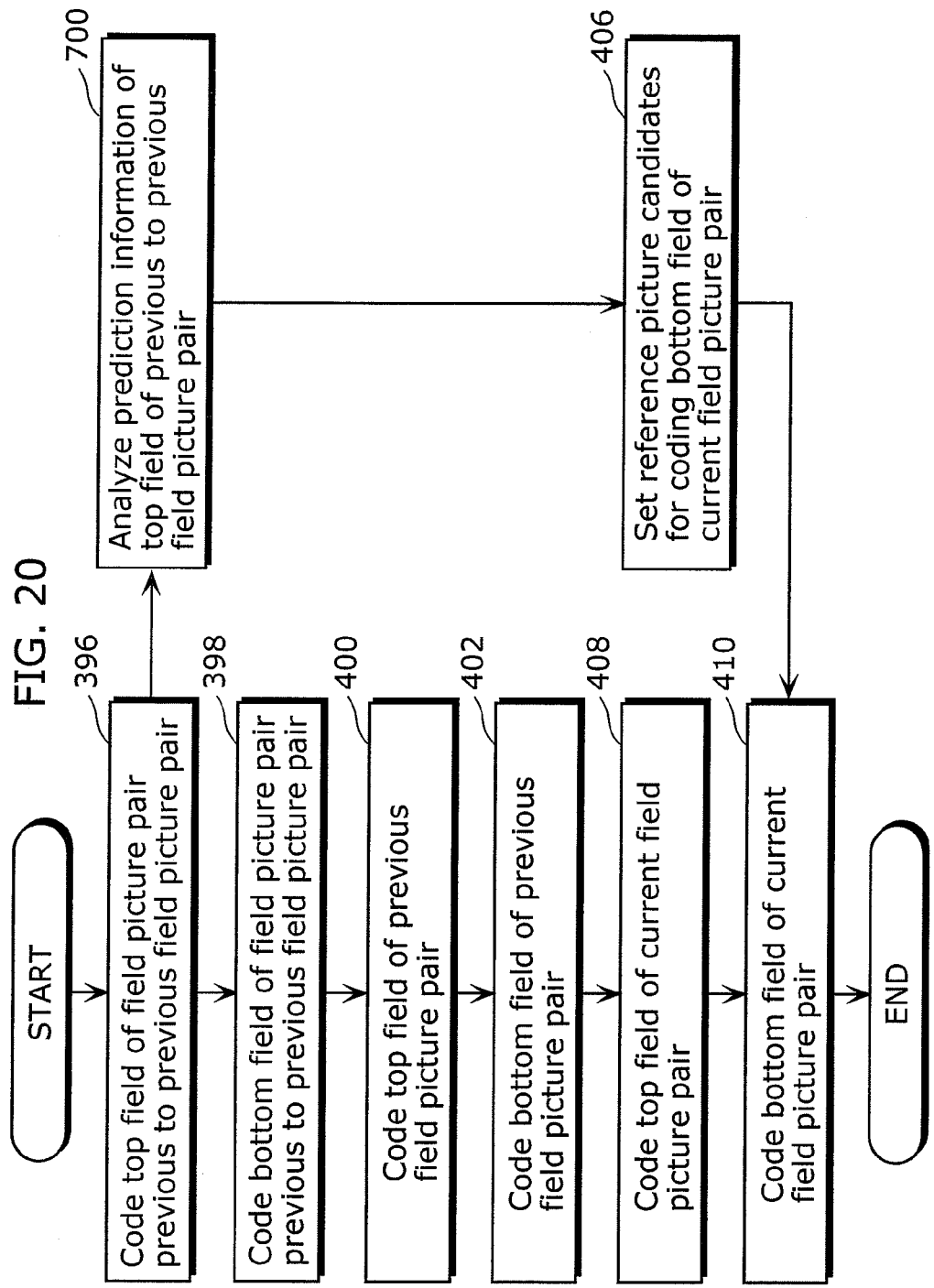
FIG. 20 is a flowchart showing coding and reference picture setting processes in the image coding apparatus according to the sixth embodiment.

FIG. 20 is a flowchart showing coding and reference picture setting processes in the image coding apparatus according to the sixth embodiment. FIG. 19 shows coding process in the fields 302, 304, 308, 310, 314 and 316 and process for setting the reference picture candidate by indirectly predicting the motion in the current field. FIG. 20 is different from the reference picture setting process in the second embodiment shown in FIG. 9 in that the modules 396 and 398 are specified and that the module 700 obtains the prediction information from the module 396. The modules 400 to 410 in FIG. 20 perform the same process as described in FIG. 9. The same description is omitted and description will be made hereinafter focusing on the difference.

In the module 396, the top field 302 in the field 300 previous to the previous field pair (two field pairs preceding) is coded. The prediction information in the top field 302 is transferred from the coding module 398 to the analysis module 700. The prediction information is information indicating whether or not intra coding is performed on each block, and may be transferred after coding each macroblock, each slice or the entire field. In the module 398, the bottom field 302 in the previous to previous (two field pairs preceding) field pair 300 is coded.

In the module 700, the prediction information obtained from the module 396 is analyzed. The details of the modules 700 and 406 are the same as the description made in FIGS. 10 and 8.

As described above, according to the reference picture selection method of the sixth embodiment, in the same manner as described in the second embodiment, the degree of the motion in the current bottom field 316 can be predicted with an easy process by counting the first and second counts based on the prediction information (information indicating whether the block is intra coded or not) which can be easily obtained in the coding process of the specific field (here, the top field 302 in the field pair preceding the current bottom field in coding order).

The degree of motion can be properly predicted as a ratio (or a difference) of the first count and the second count, or a ratio (or a difference) of the number of times the first reference picture is referred to and the second reference picture is referred. It indicates that, the smaller the ratio or the difference is, the larger the motion becomes. In addition, with simple comparison using the threshold, the reference picture candidate can be properly set.

With this, it is possible to reduce amount of process for selecting a reference picture, and it is possible to achieve approximately the same coding efficiency as in the case where there is no limit on the reference picture candidates.

Seventh Embodiment

The present embodiment differs from the fifth embodiment in that the specific field is a different picture. The same description is omitted and description will be made hereinafter focusing on the difference.

The specific field in the seventh embodiment represents the top field in a field pair two pairs previous to the previous reference field pair (three field pairs preceding) of the current bottom field in coding order.

Figure 21:
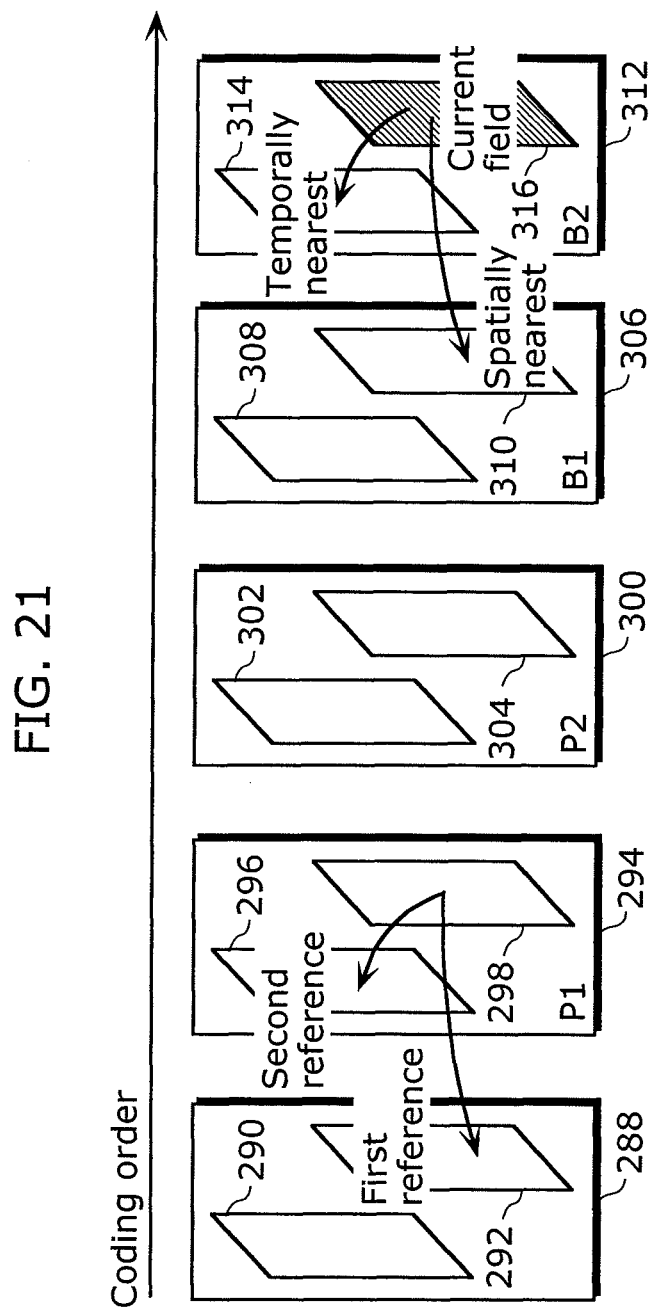
FIG. 21 shows an example of pictures in coding used for the reference picture selection method and the image coding method according to the seventh embodiment.

FIG. 21 shows an example of pictures in coding order used for the reference picture selection method and the image coding method according to the seventh embodiment. The field pairs 288, 294, 300, 306 and 312 are respectively, for example, I- or P-picture, P-picture, P-picture, B-picture, and B-picture. The bottom field 298 is the specific field for the current bottom field 316. The top field 296 in the same field pair 294 as the specific field 298 is referred to as the second reference picture. The bottom field 292 in the field pair 288 which is previous to the specific field 298 in coding order is referred to as the first reference picture.

Figure 22:
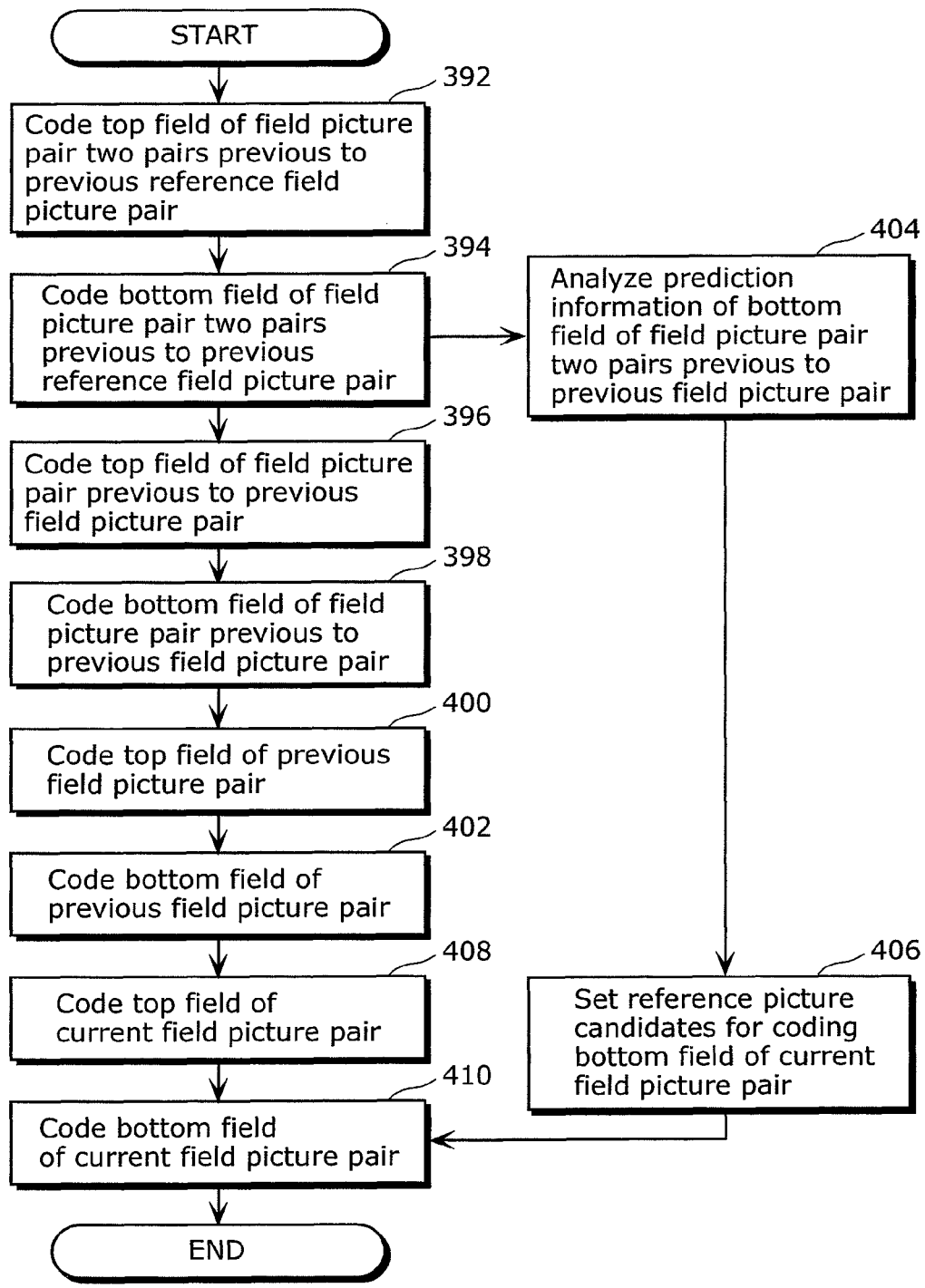
FIG. 22 is a flowchart showing coding and reference picture setting processes in the image coding apparatus according to the seventh embodiment.

FIG. 22 is a flowchart showing coding and reference picture setting processes in the image coding apparatus according to the seventh embodiment. FIG. 22 shows coding process in the fields 290, 292, 302, 304, 308, 310, 314 and 316 and process for setting the reference picture candidate by indirectly predicting the motion in the current field. FIG. 22 is different from the reference picture setting process in the fifth embodiment shown in FIG. 19 in that the modules 392 and 394 are specified and that the module 404 obtains the prediction information from the module 394. The modules 396 to 410 in FIG. 22 perform the same process as described in FIG. 19. The same description is omitted and description will be made hereinafter focusing on the difference.

The prediction information in the bottom field 298 is transferred from the coding module 394 to the analysis module 404. The prediction information is information indicating a reference picture actually used for coding each block, and may be transferred after coding each macroblock, each slice or the entire field picture.

In the module 404, the prediction information obtained from the module 394 is analyzed. The details of the modules 404 and 406 are the same as the description made in FIGS. 7 and 8.

As described above, according to the reference picture selection method of the seventh embodiment, the same effect as in each of the embodiment can be achieved using a different specific field.

Eighth Embodiment

The eighth embodiment differs from the sixth embodiment in that the specific field is a different picture. The same description is omitted and description will be made hereinafter focusing on the difference.

The specific field in the eighth embodiment represents the top field in a field pair two pairs previous to the previous reference field pair (three field pairs preceding) of the current bottom field in coding order. In the eighth embodiment, the description is made with reference to the example of pictures shown in FIG. 21.

Figure 23:
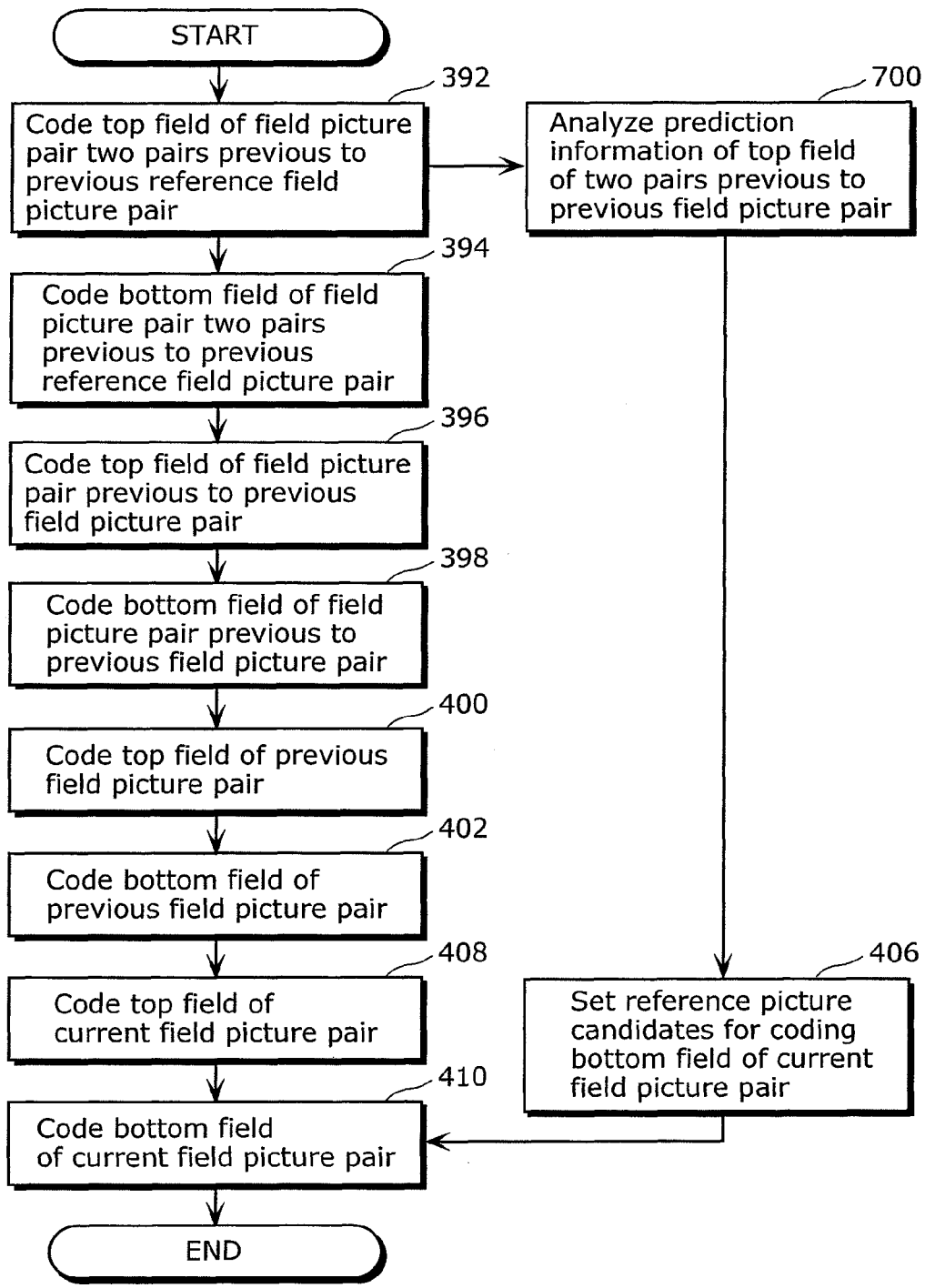
FIG. 23 is a flowchart showing coding and reference picture setting processes in the image coding apparatus according to the eighth embodiment.

FIG. 23 is a flowchart showing coding and reference picture setting processes in the image coding apparatus according to the eighth embodiment. FIG. 23 is different from the reference picture setting process in the sixth embodiment shown in FIG. 20 in that the modules 392 and 394 are specified and that the module 700 obtains the prediction information from the module 392. FIG. 23 is the same as the sixth embodiment except for this point.

As described above, according to the reference picture selection method of the eighth embodiment, the same effect as in each of the embodiment can be achieved using a different specific field.

Ninth Embodiment

In each of the embodiments above, the degree of motion in the current bottom field is indirectly and easily predicted or estimated with reference to the prediction information of the specific field. On the other hand, in the ninth embodiment, a reference picture selection method which predicts the degree of motion in the current bottom field by checking whether the temporally nearest field or the spatially nearest field is of the higher correlation with the current bottom field.

Figure 24:
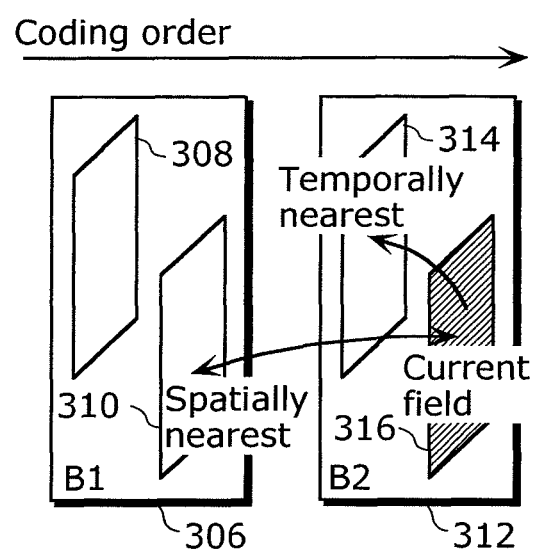
FIG. 24 shows an example of pictures in coding order used for the reference picture selection method and the image coding method according to the ninth embodiment.

FIG. 24 shows an example of pictures in coding order used for the reference picture selection method and the image coding method according to the ninth embodiment. The field pairs 306 and 312 are, for example, respectively B-pictures. The correlation between the current bottom field 316 and the temporally nearest field 314 can be easily calculated from the difference between the two. In the same manner, the correlation between the current bottom field 316 and the spatially nearest field 310 can be easily calculated from the difference between the two.

Figure 25:
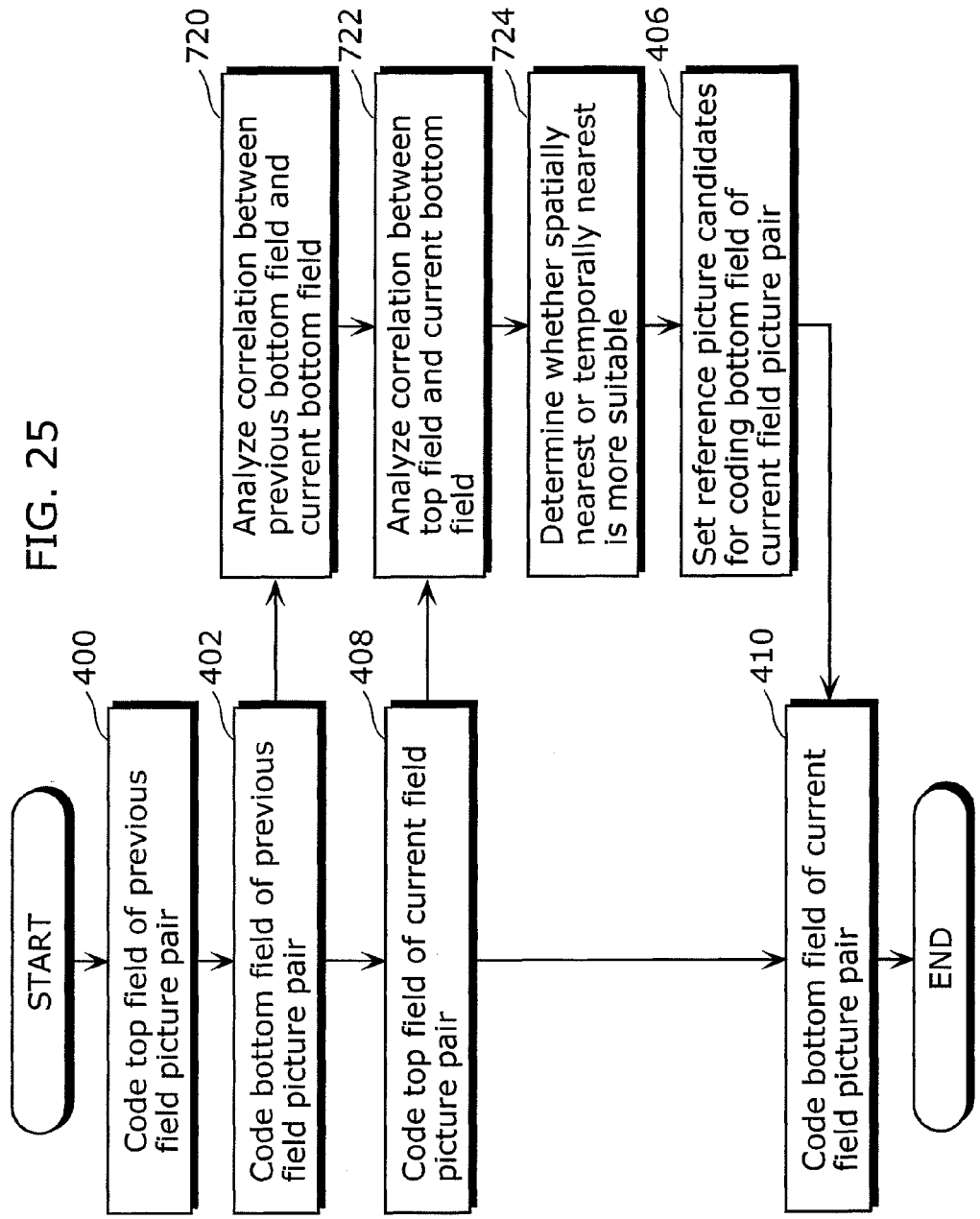
FIG. 25 is a flowchart showing coding and reference picture setting processes in the image coding apparatus according to the ninth embodiment.

FIG. 25 is a flowchart showing coding and reference picture setting processes in the image coding apparatus according to the ninth embodiment. FIG. 25 shows coding process in the fields 308, 310, 314 and 316 as shown in FIG. 24, and process for setting a reference picture candidate by indirectly predicting the motions in the current field (modules 720 to 724 and 406). The modules 400, 402, 406, 408 and 410 are the same as the modules shown in FIG. 6 according to the first embodiment.

In the module 720, the correlation between the previous bottom field (spatially nearest field) 310 and the current bottom field 316 is calculated. Here, the difference between the corresponding pixels between the two fields is calculated, and a total sum of the difference is calculated as a correlation. Upon the calculation of correlation, each pixel value of the current bottom field 316 is read out from the input picture memory, and each pixel value of the spatially nearest field 310 is read out from the reference picture memory 109 or the input picture memory 101. The spatial correlation is higher the less the total sum of the difference is.

In the module 722, the correlation between the top field (temporally nearest field) 314 and the current bottom field 316 (hereinafter referred to as temporal correlation) is calculated. The calculation is the same as the calculation in the module 720. The spatial correlation is higher the less the total sum of the difference is.

In the module 724, a spatial-temporal determination is made based on the two correlations. More specifically, in the case where the spatial correlation is higher than the temporal correlation, it is determined that the spatially nearest field is more suitable for the reference picture candidate than the temporally nearest reference field. On the other hand, when the temporal correlation is higher than the spatial correlation, it is determined that the temporally nearest reference field is more suitable than the spatially nearest reference field as the reference picture candidate.

The module 406 is the same as described in FIG. 8, and the spatially nearest field or the temporally nearest field is set as the reference picture candidate based on the determination made in the module 724.

As described above, according to the reference picture selection method of the ninth embodiment, the degree of motion in the current bottom field is predicted indirectly by the spatial correlation and the temporal correlation. In addition, this can be achieved by a simple calculation of the total sum of the differences.

Tenth Embodiment

In the ninth embodiment, the degree of motion in the current bottom field is predicted by calculating the two correlations. On the contrary, in the tenth embodiment, a reference picture selection method for predicting the degree of motion by searching whether a motion of a reduced size image in the temporally nearest field or spatially nearest field is larger than a reduced size image in the spatially nearest field.

Figure 26:
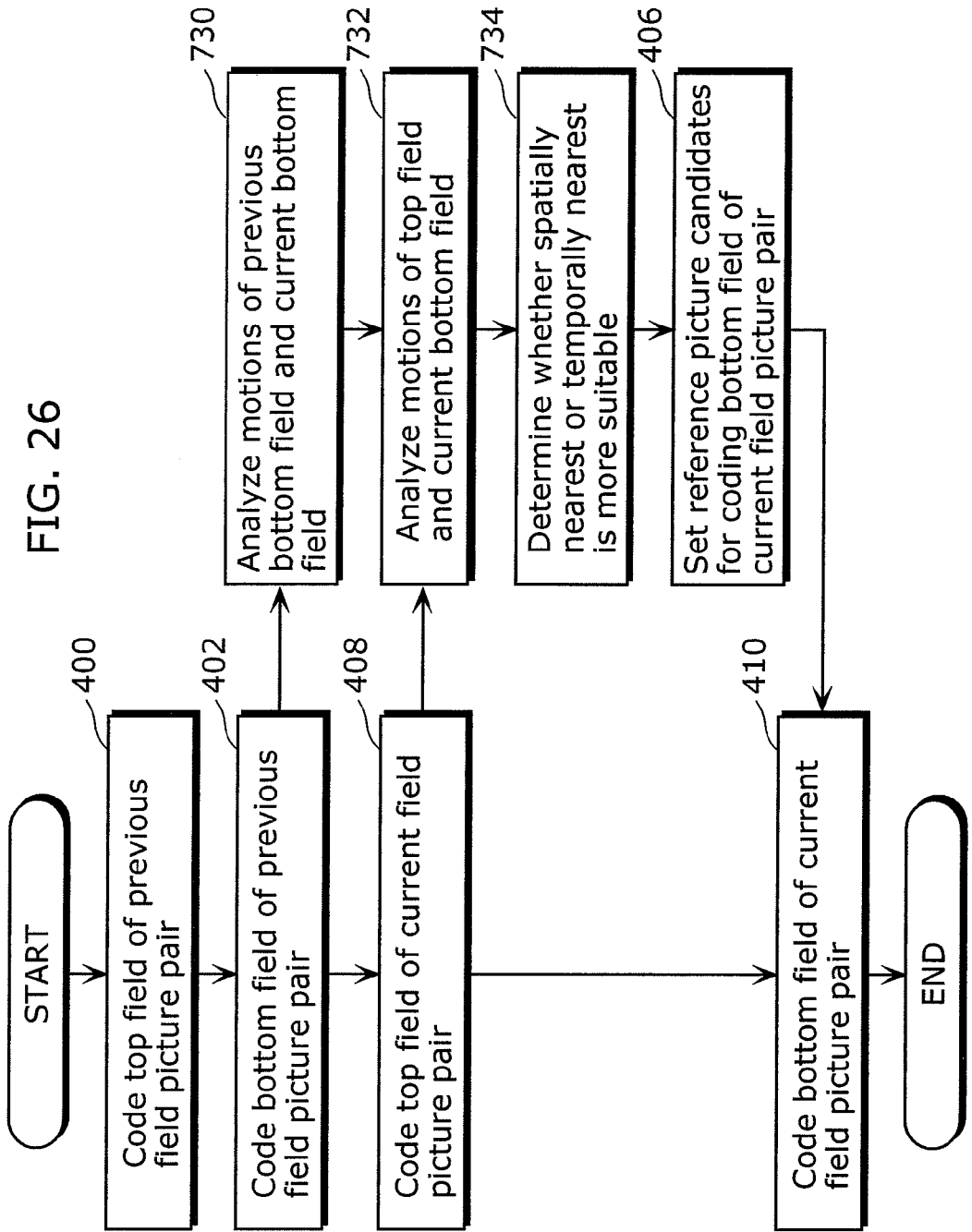
FIG. 26 is a flowchart showing coding and reference picture setting processes in the image coding apparatus according to the tenth embodiment.

FIG. 26 is a flowchart showing coding and reference picture setting processes in the image coding apparatus according to the tenth embodiment. FIG. 26 shows coding process in the fields 308, 310, 314 and 316 shown in FIG. 24, and process for setting a reference picture candidate by indirectly predicting the motion in the current field (modules 730 to 734 and 406). The modules 400, 402, 406, 408 and 410 are the same as the modules shown in FIG. 6 according to the first embodiment.

In the module 730, a reduced-size image of the previous nearest bottom field (spatially nearest field) 310 is generated, and a degree of motion of the current bottom field 316 (hereinafter referred to as the first degree of motion) is predicted using the two reduced-size images. The reduced-size image may have, for example, a vertical to horizontal ratio of 1/2, 1/3, and 1/4 . . . . When predicting the degree of motion, a motion vector may be estimated for each block of the reduced-size image, or a motion vectors may be estimated by sampling several representative blocks. As described above, "the degree of motion" is predicted based on the total sum of the motion vectors of the blocks or the total sum of the absolute value of the motion vectors.

In the module 732, a reduced-size image of the nearest previous top field (temporally nearest field) 314 is generated, and the degree of motion in the current bottom field 316 (hereinafter referred to as the second degree of motion) is predicted using the reduced-size picture and the reduced-size image of the current bottom field 316. The motion may be predicted in the same manner as described above.

In the module 734, a spatial-temporal determination is made based on the first and the second degrees of motion. More specifically, when the first degree of motion is larger than the second degree of motion, it is determined that the spatially nearest field is more suitable for the reference picture candidate than the temporally nearest field. On the other hand, when the second degree of motion is larger than the first degree of motion, it is determined that the temporally nearest field is more suitable for the reference picture candidate than the spatially nearest field.

The module 406 is the same as described in FIG. 8, and the spatially nearest field or the temporally nearest field is set as the reference picture candidate based on the determination made in the module 734.

As described above, according to the reference picture selection method of the tenth embodiment, the degree of motion in the current bottom field is properly predicted using the reduced-size images. Furthermore, this can be achieved by a simple computation such as estimating the motion vector of the reduced-size image.

The functional blocks of the block diagrams and the modules in the flowcharts shown in the above embodiments are typically achieved in the form of an integrated circuit or a Large Scale Integrated (LSI) circuit. Each of these parts can be in plural single-function LSIs, or also can be in one integrated LSI. (For example, functional blocks other than memory may be integrated into one LSI.) The name used here is LSI, but it may also be called IC, system LSI, super LSI, or ultra LSI depending on the degree of integration.

Moreover, ways to achieve integration are not limited to the LSI, and special circuit or general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

In the future, with advancement in the semiconductor technology or related technology, a brand-new technology may replace LSI. The integration can be carried out by that technology. Application of biotechnology is one such possibility.

Furthermore, among each of the functional blocks, a unit in which data is stored may be incorporated into a recording medium or a DRAM, instead of integrating into one chip.

Note that the essential parts shown in the flowchart described in the embodiments can be achieved by processors or programs.

As described above, the image coding method and the image decoding method shown in the embodiments above may be used for any device or system; thereby the effects described in the above embodiments can be achieved.

In addition, the present invention is not limited to the embodiments above. Many variations and modifications are possible without materially departing from the scope of the present invention.

Note that, a reference index setting process of assigning index (FIG. 15), among the reference picture candidates, the temporally nearest field or the spatially nearest field by the least-bit reference index may be added.

The reference picture candidates for the current bottom field are set in the reference picture selection methods in the embodiments above, however, reference picture candidates for the current top field may also be set. For example, the subset of the reference picture candidates in FIG. 3A which are shown in the arrows in broken line and the subset of the reference picture candidates in FIG. 3B which are shown in the arrows in broken line may be set according to the degree of motion in the current top field.

In the first, fourth, fifth, and seventh embodiments, in the module 404 shown in FIG. 7, the first count and the second count are counted, the first count being the number of blocks that are coded using the first reference picture and the second count being the number of blocks that are coded using the second reference picture (modules 508 to 514), however, a second count which is the number of blocks that are coded in intra coding, and a first count which is the number of blocks that are coded in coding other than intra coding may be counted.

In the second, third, fourth, and sixth embodiments, in the module 700 shown in FIG. 10, the first count and the second count are counted, the first count being the number of blocks that are coded in intra coding and the second count being the number of blocks that are coded in coding other than intra coding (modules 806 to 810), however, the first count and the second count are counted, the first count being the number of blocks that are coded using the first reference picture and the second count being the number of blocks that are coded using the second reference picture. In this case, the first reference picture may be a bottom field preceding the specific field, and the second reference picture may be a top field in the same field pair as the first reference picture.

In addition, the first reference picture and the second reference picture shown in FIGS. 18 and 21 may be reversed. More specifically, the top field 302 and 296 may be the first reference pictures, and the bottom field 298 and 292 may be the second reference pictures. In this case, Y and N shown in the module 520 in FIG. 7 may be reversed. In this case, when the ratio in the module 520 (the value in the first reference counter/the second reference counter) is larger, it is predicted that the motion of the current bottom field would be large, whereas when the ratio is smaller, it is predicted that the motion of the current bottom field is smaller.

INDUSTRIAL APPLICABILITY

The present invention is suitable for a coding apparatus and a decoding apparatus which respectively codes or decodes an image, and is also suitable for a web server for delivering a moving picture, a network terminal for receiving the moving picture, a digital camera on which a moving picture can be recorded and reproduced, a mobile phone with a digital camera, a DVD recorder/player, PDA, and a personal computer and other devices.

The invention claimed is:

1. A reference picture selection method for selecting a reference picture for a current bottom field to be coded when coding interlaced video, said method comprising:
predicting a first degree of motion of the current bottom field and a second degree of motion of the current bottom field, the first degree of motion being predicted using a first field, and the second degree of motion being predicted using a second field which precedes the current bottom field in coding order;
comparing the predicted first degree of motion to the predicted second degree of motion;
selecting, according to a comparison result in said comparing, only pictures suitable for the coding of the current bottom field from a plurality of pictures included in the interlaced video;
setting the selected pictures as reference picture candidates, so as to exclude a picture not suitable for the coding of the current bottom field from the reference picture candidates; and
selecting a reference picture for the current bottom field, from among the set reference picture candidates.

2. The reference picture selection method according to claim 1,
wherein, in said setting the selected pictures as reference picture candidates, one of a temporally nearest field and a spatially nearest field is set in the reference picture candidates, according to the comparison result in said comparing,
the temporally nearest field is a top field in the same field pair as the current bottom field, and
the spatially nearest field is a bottom field in a field pair which is immediately previous to the current bottom field in coding order, the field pair being coded in bi-predictive coding.

3. The reference picture selection method according to claim 2,
wherein in said predicting the first degree of motion and the second degree of motion, a first correlation is calculated as the first degree of motion, and a second correlation is calculated as the second degree of motion,
the first correlation is a correlation between the current bottom field and the first field, and the second correlation is a correlation between the current bottom field and the second field, and
in said setting the selected pictures as reference picture candidates, the reference picture candidates are set based on one of a ratio of the first correlation to the second correlation and a difference of the first correlation and the second correlation.

4. The reference picture selection method according to claim 3,
wherein, in said setting the selected pictures as reference picture candidates,
one of a temporally nearest field and a spatially nearest field is set in the reference picture candidates based on one of the ratio of the first correlation to the second correlation and the difference of the first correlation and the second correlation.

5. The reference picture selection method according to claim 2,
wherein said predicting the first degree of motion and the second degree of motion includes:
generating reduced size images of the first field, the second field and the current bottom field respectively;
estimating a first motion of the current bottom field from the first field using the reduced size images of the first field and the current bottom field; and
estimating a second motion of the current bottom field from the second field using the reduced size images of the second field and the current bottom field.

6. The reference picture selection method according to claim 5,
wherein, in said setting the selected pictures as reference picture candidates,
one of the temporally nearest field and the spatially nearest field is set in the reference picture candidates according to the first and second estimated motions.

7. The reference picture selection method according to claim 1,
wherein the current bottom field is in a field pair from which a picture coded in bi-predictive inter picture coding can be referred,
in said setting of the selected pictures as reference picture candidates,
one of a first subset and a second subset each of which includes the reference picture candidates selected from all pictures available for reference is selected based on the predicted first degree of motion and the predicted second degree of motion,
the first subset includes a temporally nearest field and does not include a spatially nearest field,
the second subset includes the spatially nearest field and does not include the temporally nearest field,
the temporally nearest field is a top field in the same field pair as the current bottom field, and
the spatially nearest field is a bottom field in the previous field pair coded in bi-predictive coding.

8. The reference picture selection method according to claim 1, further comprising
assigning a reference index of the least bits in the case where the reference picture candidate includes a temporally nearest field, and
assigning a reference index of the least bits in the case where the reference picture candidate includes a spatially nearest field.

9. An image coding method comprising the reference picture selection method according to claim 1.

10. A non-transitory computer-readable medium having a program recorded thereon for causing a computer to execute the reference picture selection method according to claim 1.

11. An image coding apparatus which codes interlaced video, said image coding apparatus comprising:
a predicting unit operable to predict a first degree of motion of a current bottom field and a second degree of motion of the current bottom field, the first degree of motion being predicted using a first field, and the second degree of motion being predicted using a second field which precedes the current bottom field in coding order;
a comparison unit operable to compare the predicted first degree of motion to the predicted second degree of motion;
a setting unit operable to select, according to a comparison result of said comparison unit, only pictures suitable for the coding of the current bottom field from a plurality of pictures included in the interlaced video, and to set the selected pictures as reference picture candidates, so as to exclude a picture not suitable for the coding of the current bottom field from the reference picture candidates;
a selecting unit operable to select a reference picture of the current bottom field from among the set reference picture candidates; and a coding unit operable to code the current bottom field using the selected reference picture.

12. A semiconductor device which codes interlaced video, said semiconductor device comprising:

a predicting unit operable to predict a first degree of motion of a current bottom field and a second degree of motion of the current bottom field, the first degree of motion being predicted using a first field, and the second degree of motion being predicted using a second field which precedes the current bottom field in coding order;

a setting unit operable to select, according to a comparison result of said comparison unit, only pictures suitable for the coding of the current bottom field from a plurality of pictures included in the interlaced video, and to set the selected pictures as reference picture candidates, so as to exclude a picture not suitable for the coding of the current bottom field from the reference picture candidates;

a selecting unit operable to select a reference picture of the current bottom field from among the set reference picture candidates; and a coding unit operable to code the current bottom field using the selected reference picture.

13. Computer-readable stream data recorded on a non-transitory computer-readable medium, said stream data representing coded interlaced video, and said stream data comprising:

stream data generated by using the image coding method according to claim 9.

* * * * *